(12) United States Patent
Ishikawa et al.

(10) Patent No.: US 12,096,113 B2
(45) Date of Patent: Sep. 17, 2024

(54) INFORMATION PROCESSING APPARATUS, INFORMATION PROCESSING METHOD, AND PROGRAM

(71) Applicant: Sony Semiconductor Solutions Corporation, Kanagawa (JP)

(72) Inventors: Hirotaka Ishikawa, Kanagawa (JP); Satoshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/001,721

(22) PCT Filed: Jun. 17, 2021

(86) PCT No.: PCT/JP2021/023052
§ 371 (c)(1),
(2) Date: Dec. 14, 2022

(87) PCT Pub. No.: WO2022/004412
PCT Pub. Date: Jan. 6, 2022

(65) Prior Publication Data
US 2023/0319397 A1 Oct. 5, 2023

(30) Foreign Application Priority Data
Jul. 1, 2020 (JP) .................. 2020-113755

(51) Int. Cl.
*H04N 23/65* (2023.01)
*H04N 23/667* (2023.01)

(52) U.S. Cl.
CPC ......... *H04N 23/651* (2023.01); *H04N 23/667* (2023.01)

(58) Field of Classification Search
CPC ........................ H04N 23/651; H04N 23/667
See application file for complete search history.

(56) References Cited

U.S. PATENT DOCUMENTS

| | | | |
|---|---|---|---|
| 2015/0256690 A1* | 9/2015 | Hata | H04N 21/4223 348/207.1 |
| 2017/0064211 A1* | 3/2017 | Omid-Zohoor | H04N 25/42 |
| 2021/0174123 A1* | 6/2021 | Lerner | G06T 5/20 |

FOREIGN PATENT DOCUMENTS

| | | |
|---|---|---|
| JP | 2010-165265 A | 7/2010 |
| JP | 2012-239060 A | 12/2012 |

(Continued)

OTHER PUBLICATIONS

International Search Report and Written Opinion mailed on Sep. 14, 2021, received for PCT Application PCT/JP2021/023052, filed on Jun. 17, 2021, 9 pages including English Translation.

*Primary Examiner* — Timothy J Henn
(74) *Attorney, Agent, or Firm* — XSENSUS LLP

(57) ABSTRACT

The present technology relates to an information processing apparatus, an information processing method, and a program that enables appropriate sharing of processing in accordance with a remaining capacity of a battery.
Provided is a mode switching unit that switches a mode depending on at least one of a remaining capacity of a battery or heat, the mode switching unit switching between a first mode in which a first device executes predetermined processing and a second mode in which a second device executes the predetermined processing. The predetermined processing is processing by an AI function. The present technology can be applied to, for example, a system including a surveillance camera and a server that distributes data from the surveillance camera.

12 Claims, 22 Drawing Sheets

(56) References Cited

FOREIGN PATENT DOCUMENTS

| | | |
|---|---|---|
| JP | 2017-212744 A | 11/2017 |
| JP | 2018-132865 A | 8/2018 |

* cited by examiner

FIG. 5
IMAGE A
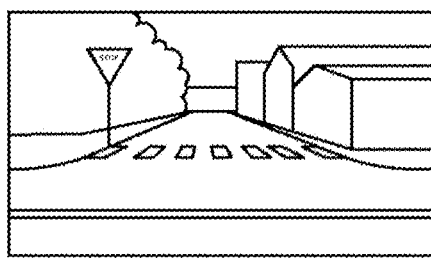
DISTRIBUTION DATA A
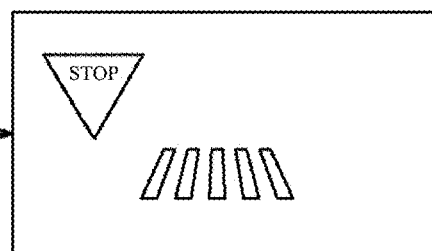
IMAGE B
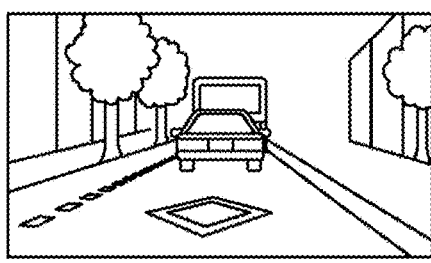
DISTRIBUTION DATA B
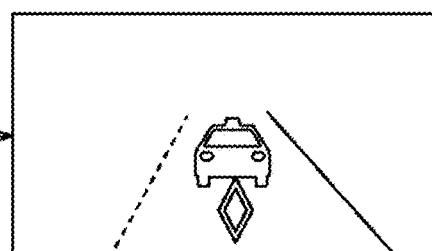
IMAGE C
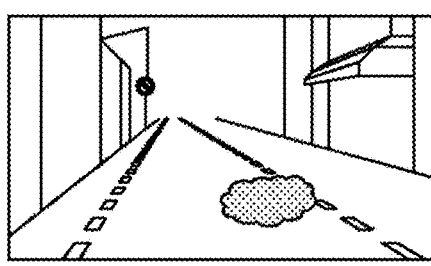
DISTRIBUTION DATA C
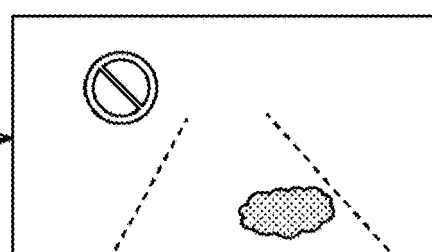
IMAGE D
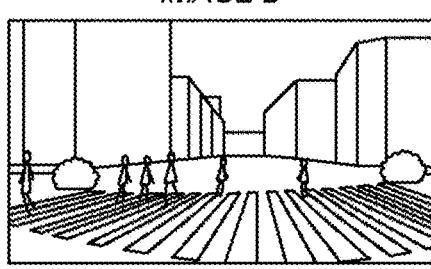
DISTRIBUTION DATA D

FIG. 6
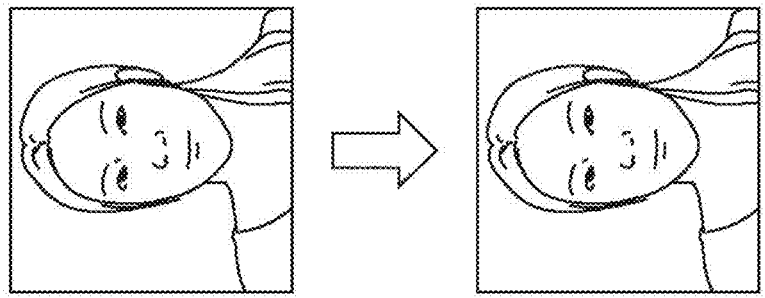
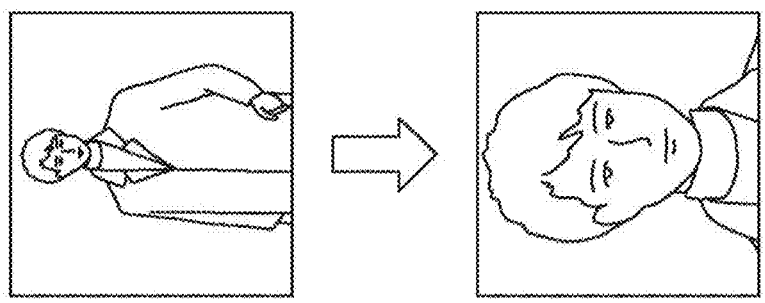
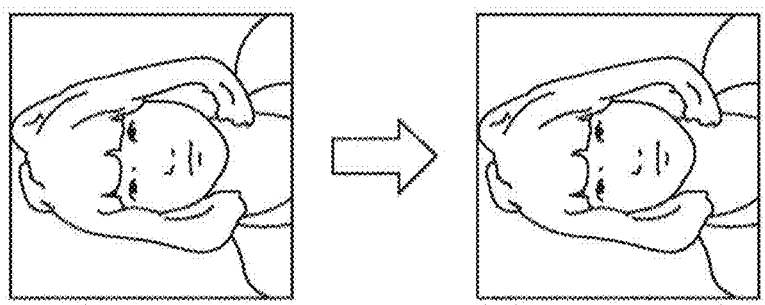
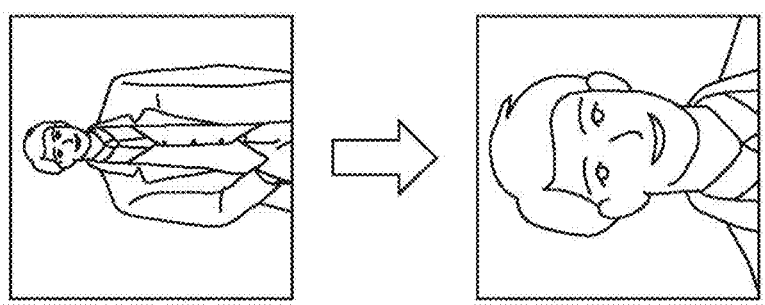
IMAGE → IMAGE AFTER PRE-PROCESSING

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2021/023052, filed Jun. 17, 2021, which claims priority to Japanese Application No. 2020-113755, filed Jul. 1, 2020, the entire contents of each are incorporated herein by reference.

TECHNICAL FIELD

The present technology relates to an information processing apparatus, an information processing method, and a program, and for example, relates to an information processing apparatus, an information processing method, and a program capable of appropriately sharing processing in accordance with a situation.

BACKGROUND ART

In recent years, surveillance cameras and the like have been installed on streets, and moreover, vehicle-mounted cameras capable of capturing images of a surrounding environment of a traveling vehicle are also mounted on the vehicle such that captured images in various places can be easily acquired. Furthermore, the surveillance cameras and the like analyze captured images to detect people or recognize a specific person.

Among these cameras, in a case of a camera to which power is supplied from a battery, there is a possibility that it becomes difficult to perform processing if a remaining capacity of the battery decreases. Patent Document 1 proposes to adjust complexity of a video stream on the basis of a remaining battery capacity.

CITATION LIST

Patent Document

Patent Document 1: Japanese Patent Application Laid-Open No. 2017-212744

SUMMARY OF THE INVENTION

Problems to be Solved by the Invention

It is desired to prevent occurrence of a case in which a capacity of a battery is reduced or a situation in which a function deteriorates due to heat generation or the like.

The present technology has been made in view of such a situation, and makes it possible to appropriately share processing such that a function does not deteriorate when a situation in which the function is likely to deteriorate occurs.

Solutions to Problems

An information processing apparatus according to one aspect of the present technology includes a mode switching unit that switches a mode depending on at least one of a remaining capacity of a battery or heat, and the mode switching unit switches between a first mode in which a first device executes predetermined processing and a second mode in which a second device executes the predetermined processing.

An information processing method according to one aspect of the present technology includes switching, by an information processing apparatus, between a first mode in which a first device executes predetermined processing and a second mode in which a second device executes the predetermined processing depending on at least one of a remaining capacity of a battery or heat.

A program according to one aspect of the present technology causes a computer to execute a process of switching between a first mode in which a first device executes predetermined processing and a second mode in which a second device executes the predetermined processing depending on at least one of a remaining capacity of a battery or heat.

In the information processing apparatus, the information processing method, and the program according to the aspects of the present technology, the first mode in which the first device executes the predetermined processing and the second mode in which the second device executes the predetermined processing are switched in accordance with the remaining capacity of the battery.

Note that the information processing apparatus may be an independent apparatus or an internal block constituting one apparatus.

Furthermore, the program can be provided by being transmitted via a transmission medium or by being recorded on a recording medium.

BRIEF DESCRIPTION OF DRAWINGS

FIG. 5 is a diagram depicting examples of distribution data.

FIG. 6 is a diagram for explaining processing performed by the pre-processing unit.

MODE FOR CARRYING OUT THE INVENTION

Hereinafter, modes for carrying out the present technology (hereinafter, referred to as embodiments) will be described.

<Schematic Configuration of Data Distribution System>

Figure 1:
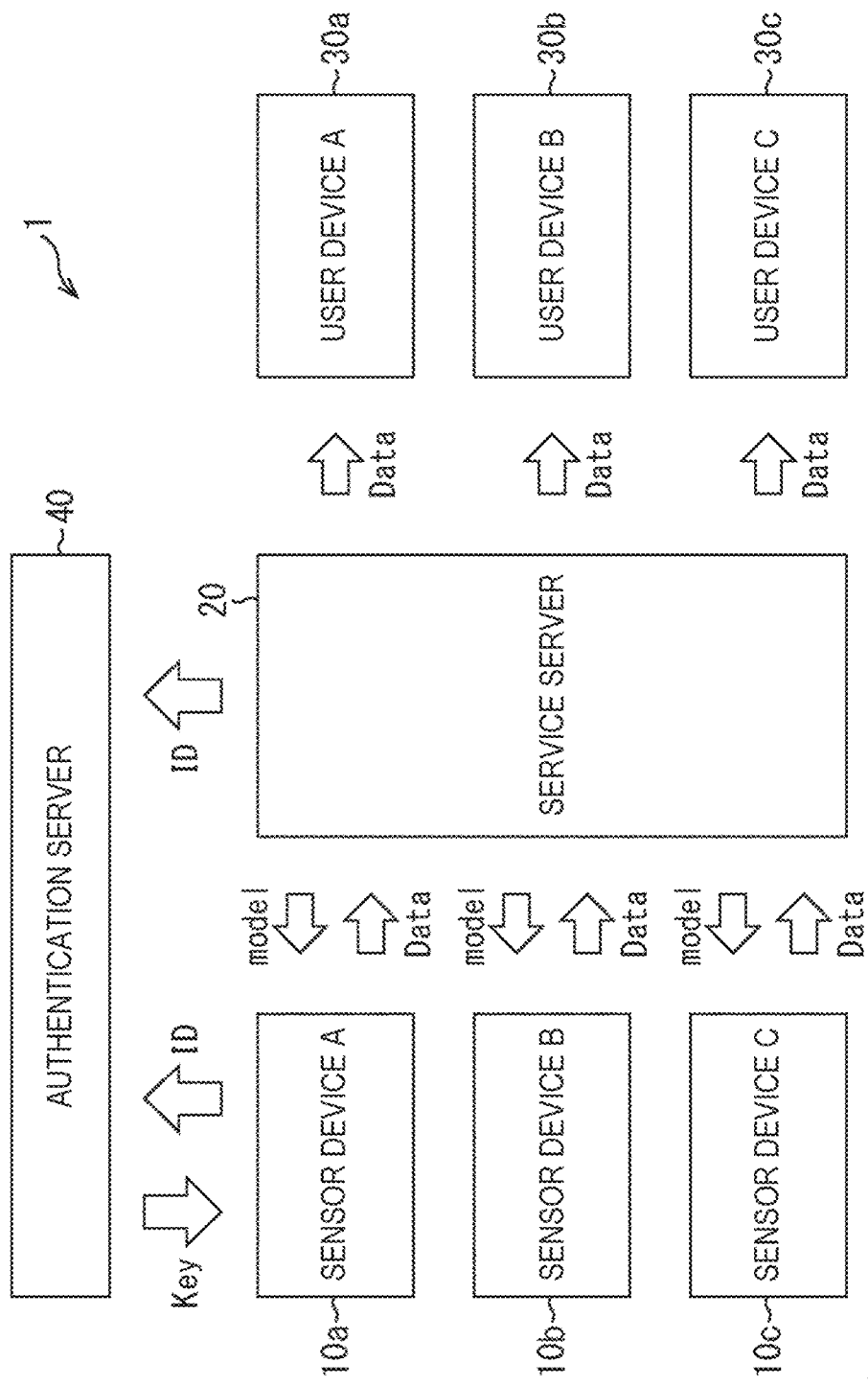
FIG. 1 is a diagram depicting a configuration of an embodiment of a data distribution system to which the present technology is applied.

A configuration example of a data distribution system 1 according to an embodiment of the present disclosure will be described with reference to FIG. 1. FIG. 1 is a system diagram depicting a schematic functional configuration of the data distribution system 1 according to the embodiment of the present disclosure. Specifically, as depicted in FIG. 1, the data distribution system 1 according to the present embodiment can mainly include a plurality of sensor devices 10*a*, 10*b*, and 10*c*, a service server 20, a plurality of user devices 30*a*, 30*b*, and 30*c*, and an authentication server 40.

Each of these devices is connected to a network (not illustrated) via a base station (not illustrated) or the like (for example, a base station of a mobile phone, an access point of a wireless local area network (LAN), and the like), for example, thereby constructing the data distribution system 1. Note that, as a communication method used in the network described above, any method can be applied regardless of being wired or wireless (for example, a fifth generation communication system, WiFi (registered trademark), Bluetooth (registered trademark), and the like), and a communication method capable of stably transmitting a large volume of data at a high speed can be used.

Furthermore, the number of sensor devices 10 and the number of user devices (request sources) 30 included in the data distribution system 1 are not limited to three as illustrated in FIG. 1, and three or more sensor devices 10 and three or more user devices 30 may be included in the data distribution system 1 according to the present embodiment. That is, the data distribution system 1 according to the present embodiment can manage the plurality of sensor devices 10, receive requests from the plurality of user devices 30, and transmit data to them. Hereinafter, an outline of each of the devices included in the data distribution system 1 according to the present embodiment will be described.

<Sensor Device>

The sensor device 10 can acquire sensing data (for example, an image, a sound, and the like) of a surrounding installation environment, and transmit distribution data (predetermined data) acquired from the acquired sensing data to an external device such as the user device 30 as described later. Furthermore, the sensor device 10 is desirably equipped with artificial intelligence (AI) functions, and can recognize whether or not the acquired sensing data corresponds to a request (distribution request) from a user on the basis of a recognition model transmitted from the service server 20 as described later. The sensor device 10 functions as an information processing apparatus that handles the sensing data.

For example, the sensor device 10 can be an imaging device (camera) mounted on a mobile body such as an automobile, an imaging device mounted on a smartphone carried by a user, or an imaging device such as a surveillance camera installed in a home, a store, or the like, and in this case, the sensing data is an image. In this case, these imaging devices can acquire an image by collecting light from a subject in the periphery of an installation location, forming a light image on an imaging surface, and converting the light image formed on the imaging surface into an electrical image signal.

Note that the mobile body can be an automobile, an electric vehicle, a hybrid electric vehicle, a motorcycle, a bicycle, a personal mobility, an airplane, a drone, a ship, a robot (mobile robot), a construction machine, an agricultural machine (tractor), or the like in the following description unless otherwise specified.

Furthermore, the sensor device 10 is not limited to the above-described imaging device. For example, the sensor device 10 may be a depth sensor that measures a distance (depth) to a subject, a sound collecting device such as a microphone that collects sound of a surrounding environment, a temperature sensor and a humidity sensor that measure a temperature and a humidity of a surrounding environment, a water level sensor that measures a water level of a river or the like, and the like.

Note that an internal configuration of the sensor device 10 is not basically limited as long as an interface (data transfer format, data transfer method, or the like) common to the data distribution system 1 is provided. Therefore, the data distribution system 1 according to the present embodiment can incorporate various sensor devices 10 having different specifications. Note that a detailed configuration of the sensor device 10 will be described later.

<Service Server>

The service server 20 is a computer that receives a distribution request for requesting distribution of distribution data that can be generated from the sensing data described above from the user device 30 as described later. Furthermore, the service server 20 functions as an information processing apparatus that transmits and receives data to and from the sensor device 10 and the user device 30 and processes the data.

Furthermore, the service server 20 can integrate a plurality of distribution requests (requests), generate a recognition model according to the distribution requests, and transmit the generated recognition model to the above-described sensor device 10. The recognition model is provided for recognition by the sensor device 10, and details thereof will be described later.

Furthermore, the service server 20 can receive distribution data from the sensor device 10 and transmit the received distribution data to the user device 30 corresponding to the distribution request described above as necessary. For example, the service server 20 can be achieved by hardware such as a central processing unit (CPU), a read only memory (ROM), or a random access memory (RAM). Note that a detailed configuration of the service server 20 will be described later.

<User Device>

The user device 30 is a terminal that is carried by a user or installed in the vicinity of the user, and can receive information input from the user, transmit the received information to the service server 20 as a distribution request, and receive distribution data related to the distribution request. For example, the user device 30 can be an information processing apparatus such as a mobile terminal such as a tablet personal computer (PC), a smartphone, a mobile phone, a laptop PC, or a notebook PC, or a wearable device such as a head mounted display (HMD).

More specifically, the user device 30 may include a display section (not illustrated) that performs a display toward a user, an operation section (not illustrated) that receives an operation from the user, a speaker (not illustrated) that outputs a sound toward the user, and the like.

Note that, in the user device 30, for example, an application (app) common to the data distribution system 1 or an application having a specification common to the above-described service server 20 can be installed. When the above-described application is installed, the user device 30 can generate and transmit a distribution request having a format or the like common to the data distribution system 1, and receive distribution data.

A user transmits a distribution request to the service server 20 via the user device 30. The distribution request includes information designating a content (data type) or the like of data whose distribution is requested by the user. For example, the distribution request can include object information constituted by an object (for example, a face, a person, an animal, a mobile body, text, a road (a sidewalk, a crosswalk, a road width, a sign, or the like), a logo, a barcode, or the like) which is a target whose distribution is requested, and information (a data type) designating what kind of information (for example, a quantity, a speed, a position, a state, an age, a sex, a specified name, an estimation result, or the like) about the object is requested.

Furthermore, the distribution request can include data format information designating a data format (for example, an image, text, or the like) of distribution data. Moreover, the distribution request can include identification information (ID) of the user or the user device 30. Note that the distribution request described above may include various types of data used when the service server 20 generates a recognition model (details will be described later).

The distribution request described above has a data format common to the data distribution system 1. For example, the distribution request can include a character string or a numeric string corresponding to object information or data format information. In this case, regarding object information and data format information requested from a user at a high frequency, a corresponding character string or numeric string is defined in advance and stored in a storage unit (not illustrated) held by the service server 20 as a database (not illustrated).

Then, the service server 20 can recognize object information and data format information corresponding to a character string or the like included in a distribution request by referring to the database described above. Furthermore, in a case where a character string or the like corresponding to object information and data format information desired by a user does not exist in the database described above, these object information and data format information may be directly described in the distribution request described above. Alternatively, in this case, a character string corresponding to the object information and the data format information desired by the user may be newly defined, and the defined character string or the like may be described in the distribution request described above and the database described above.

<Authentication Server>

The authentication server 40 is a computer that receives authentication information (ID) from each of the sensor device 10 and the service server 20, and determines whether or not each of these devices has authority to provide or be provided with service of the data distribution system 1 according to the present embodiment. Moreover, the authentication server 40 transmits a key that enables access to the service, a command to provide the service or to be provided with the service, and the like to an authorized device.

Then, the authentication information described above has a data format common to the data distribution system 1. That is, the authentication server 40 is used as an authentication application programming interface (API), and can authenticate the sensor device 10 and the service server 20 and associate the both with each other. The data distribution system 1 according to the present embodiment can ensure security of the data distribution system 1 by incorporating such an authentication server 40, and associate each of the sensor devices 10 with each of the user devices 30 via the service server 20. Furthermore, the authentication server 40 can be achieved by hardware, for example, a CPU, a ROM, a RAM, and the like. Note that the authentication server 40 may perform authentication for the user device 30.

Note that, in the data distribution system 1 according to the present embodiment, each of the sensor device 10 and the service server 20 is not necessarily achieved by a single device, and may be achieved by a plurality of devices that are connected via various wired or wireless networks (not illustrated) and cooperate with each other.

<Detailed Configuration Example of Sensor Device>

Figure 2:
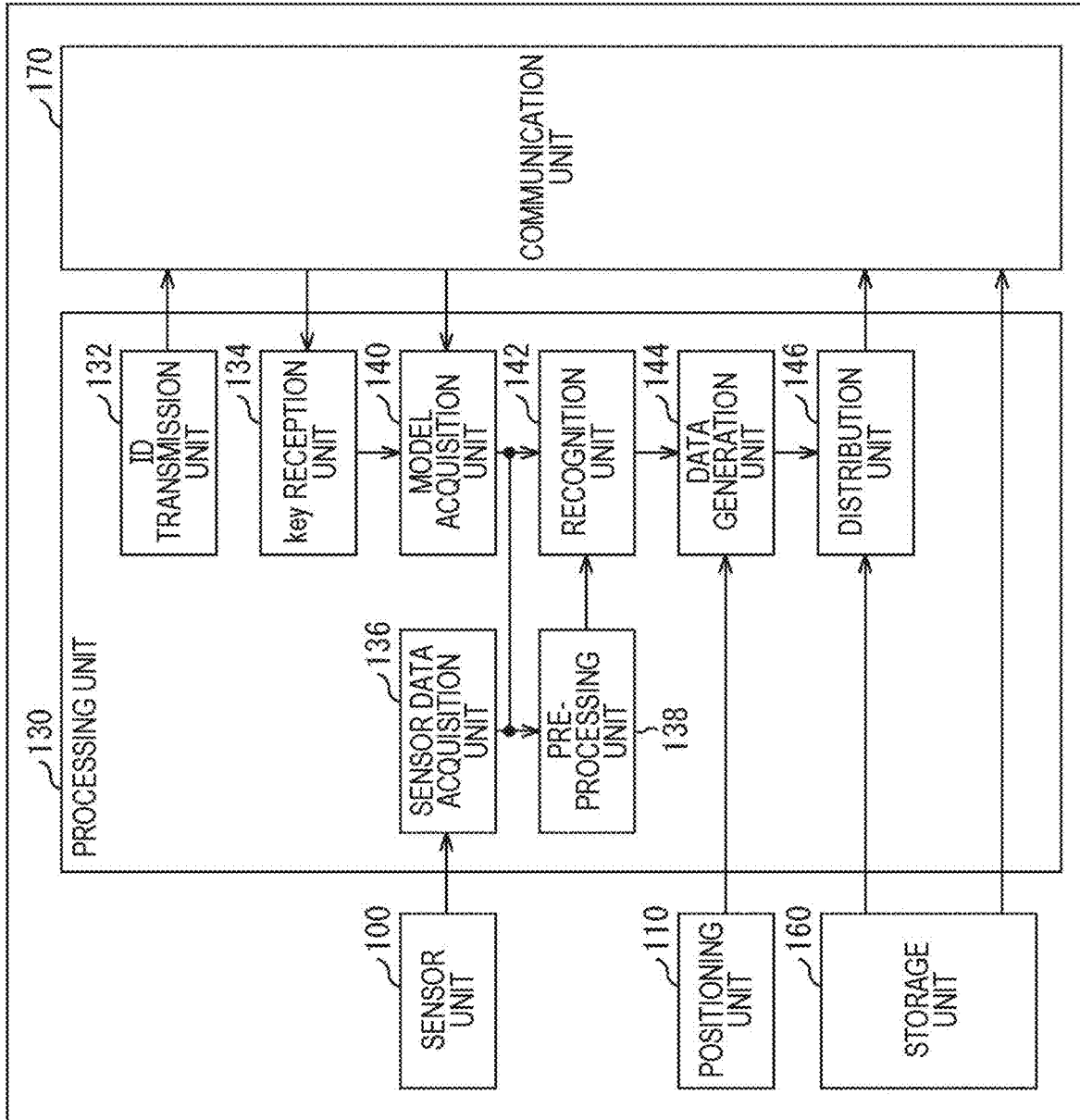
FIG. 2 is a diagram depicting a configuration example of a sensor device.

Next, a detailed configuration of the sensor device 10 according to the present embodiment will be described with reference to FIG. 2. FIG. 2 is a block diagram depicting a functional configuration example of the sensor device 10 according to the present embodiment. Specifically, as depicted in FIG. 2, the sensor device 10 mainly includes a sensor unit 100, a positioning unit 110, a processing unit 130, a storage unit 160, and a communication unit 170. Hereinafter, each functional block of the sensor device 10 will be sequentially described.

The sensor unit 100 acquires sensing data and outputs the acquired sensing data to the processing unit 130 as described later. Specifically, in a case where the sensor device 10 is an imaging device, the sensor unit 100 includes imaging optical systems such as an imaging lens and a zoom lens that collect light emitted from a subject, and an imaging element such as a charge coupled device (CCD) or a complementary metal oxide semiconductor (CMOS).

Note that the sensor unit 100 may be provided to be fixed in the sensor device 10, or may be detachably provided in the sensor device 10.

Furthermore, the sensor unit 100 may include a time of flight (TOF) sensor (not illustrated) as a depth sensor in addition to the imaging device. The TOF sensor can acquire a distance between the TOF sensor and a subject and shape information (depth information/image) such as unevenness by directly or indirectly measuring a return time of reflected light from the subject. Moreover, the sensor unit 100 may include a sound collecting device (microphone), a temperature sensor, an atmospheric pressure sensor, a humidity sensor, a wind direction/wind speed sensor, a sunshine sensor, a precipitation sensor, a water level sensor, and the like, and is not particularly limited as long as sensing data can be acquired from a surrounding environment.

The positioning unit 110 acquires positioning data of the sensor device 10 when sensing data corresponding to a distribution request is acquired, and outputs the acquired positioning data to the processing unit 130 (specifically, a data generation unit 144). For example, the positioning data is transmitted to the user device 30 by the distribution unit 146 of the processing unit 130 as described later together with distribution data.

Specifically, the positioning unit 110 can be a global navigation satellite system (GNSS) receiver or the like. In this case, the positioning unit 110 can generate positioning data indicating the latitude and longitude of a current location of the sensor device 10 on the basis of a signal from a GNSS satellite. Furthermore, it is possible to detect a relative positional relationship of a user from, for example, radio frequency identification (RFID), an access point of Wi-Fi, information regarding a wireless base station, and the like, and thus, such a communication apparatus can also be used as the positioning unit 110 described above. Note that the positioning unit 110 is not necessarily provided in the sensor device 10.

The processing unit 130 has a function of processing sensing data acquired by the sensor unit 100 and generating distribution data. The processing unit 130 is achieved by, for example, a processing circuit such as a CPU or a graphics processing unit (GPU), a ROM, a RAM, and the like. Specifically, as depicted in FIG. 2, the processing unit 130 mainly includes an ID transmission unit 132, a key reception unit 134, a sensor data acquisition unit 136, a pre-processing unit 138, a model acquisition unit 140, a recognition unit 142, a data generation unit 144, and a distribution unit 146. Hereinafter, details of each functional unit included in the processing unit 130 will be described.

The ID transmission unit 132 transmits authentication information (ID) of the sensor device 10 to the authentication server 40 via the communication unit 170 as described later. The authentication information is used when the authentication server 40 determines whether or not the sensor device 10 has authority to provide the service of the data distribution system 1 according to the present embodiment. The data distribution system 1 according to the present embodiment ensures the security of the data distribution system 1 by such authentication.

The key reception unit 134 receives a key, which enables access to the service transmitted, from the authentication server 40, a command to provide the service, and the like via the communication unit 170 as described later, and outputs the received key and the like to the model acquisition unit 140 as described later. The model acquisition unit 140 can acquire a recognition model from the service server 20 using the key and the like received by the key reception unit 134.

The sensor data acquisition unit 136 controls the sensor unit 100 to acquire sensing data output from the sensor unit 100, and outputs the acquired sensing data to the pre-processing unit 138 or the recognition unit 142 as described later.

The pre-processing unit 138 pre-processes sensing data output from the sensor data acquisition unit 136 according to information (for example, information regarding teacher data used at the time of generating the recognition model, or the like) included in a recognition model acquired by the model acquisition unit 140 as described later, and outputs the pre-processed sensing data to the recognition unit 142 as described later.

Specifically, the recognition unit 142 recognizes whether or not sensing data corresponds to a distribution request using a recognition model corresponding to the distribution request, the recognition model being obtained by machine learning. Further the sensing data is pre-processed to have form close to the recognition model, so that the sensing data suitable for the recognition described above can be provided to the recognition unit 142. As a result, the recognition accuracy in the recognition unit 142 can be improved according to the present embodiment. Note that details of the pre-processing in the pre-processing unit 138 will be described later.

The model acquisition unit 140 acquires a recognition model corresponding to a distribution request from the service server 20 via the communication unit 170 as described later, and outputs the acquired recognition model to the pre-processing unit 138 and the recognition unit 142. Note that details of the recognition model will be described later.

The recognition unit 142 can recognize whether or not sensing data output from the sensor data acquisition unit 136 or sensing data pre-processed by the pre-processing unit 138 corresponds to a distribution request on the basis of a recognition model output from the model acquisition unit 140 by utilizing the AI function or the like.

More specifically, for example, the recognition unit 142 can recognize whether or not an image of an object designated in a distribution request is included in an image as sensing data (in other words, recognize the object). Then, the recognition unit 142 outputs a result of the recognition to the data generation unit 144 as described later. Note that the recognition model can be obtained by machine learning in the service server 20, and can be, for example, characteristic information that characterizes an object, the characteristic information being obtained from data such as an image or a sound of the object designated by the distribution request. Since the recognition as described above is performed by the sensor device 10, the recognition can be performed immediately after acquisition of the sensing data. Note that details of the recognition in the recognition unit 142 will be described later.

In a case where the above-described recognition unit 142 recognizes that sensing data corresponds to a distribution request, the data generation unit 144 can generate distribution data by performing processing in response to the distribution request on the sensing data. For example, the data generation unit 144 can generate distribution data by extracting only data regarding an object designated by the distribution request from the sensing data, abstracting the data, or converting the data into text data.

More specifically, the distribution data can include at least one information of attribute information, quantity information, position information, state information, operation information, surrounding environment information, and prediction information of the object designated in the distribution request. Moreover, a data format of the distribution data may be image data, sound data, text data, or the like, and is not particularly limited. In this manner, the sensor device 10 processes the sensing data corresponding to the distribution request and generates the distribution data, so that the distribution can be implemented in real time.

Furthermore, in a case where sensing data does not correspond to a distribution request, the data generation unit 144 does not generate and distribute distribution data. Therefore, according to the present embodiment, a load of data transmission can be reduced as compared with a case where sensing data is transmitted regardless of whether or not the sensing data corresponds to a distribution request.

Moreover, for example, the data generation unit 144 can exclude information (for example, imaging of a person to the extent that the person can be specified) regarding privacy included in sensing data from distribution data. Furthermore, the data generation unit 144 can mask the information regarding the privacy on the distribution data, for example. Accordingly, protection of the privacy is ensured. Note that an example of such processing will be described later.

The distribution unit 146 distributes distribution data generated by the above-described data generation unit 144 to the user device 30 or the service server 20. Note that the distribution unit 146 can also distribute a plurality of different pieces of distribution data to the user device 30 or the service server 20. For example, the distribution unit 146 outputs, as the information described above, information on a date and time when sensing data corresponding to distribution data has been acquired, information on a date and time when the distribution data has been distributed, a data type, a data format, a distribution amount, a distribution destination (for example, recognition information of the user device 30), and the like.

The storage unit 160 stores programs, information, and the like configured for the processing unit 130 to execute various processes, and information obtained by the processes. The storage unit 160 is achieved by, for example, a storage device such as a hard disk drive (HDD).

The communication unit 170 can transmit and receive information to and from an external device such as the service server 20. The communication unit 170 can be said to be a communication interface having a function of transmitting and receiving data. Note that the communication unit 170 is achieved by a communication device (not illustrated) such as a communication antenna, a transmission/reception circuit, or a port.

<Detailed Configuration of Service Server>

Figure 3:
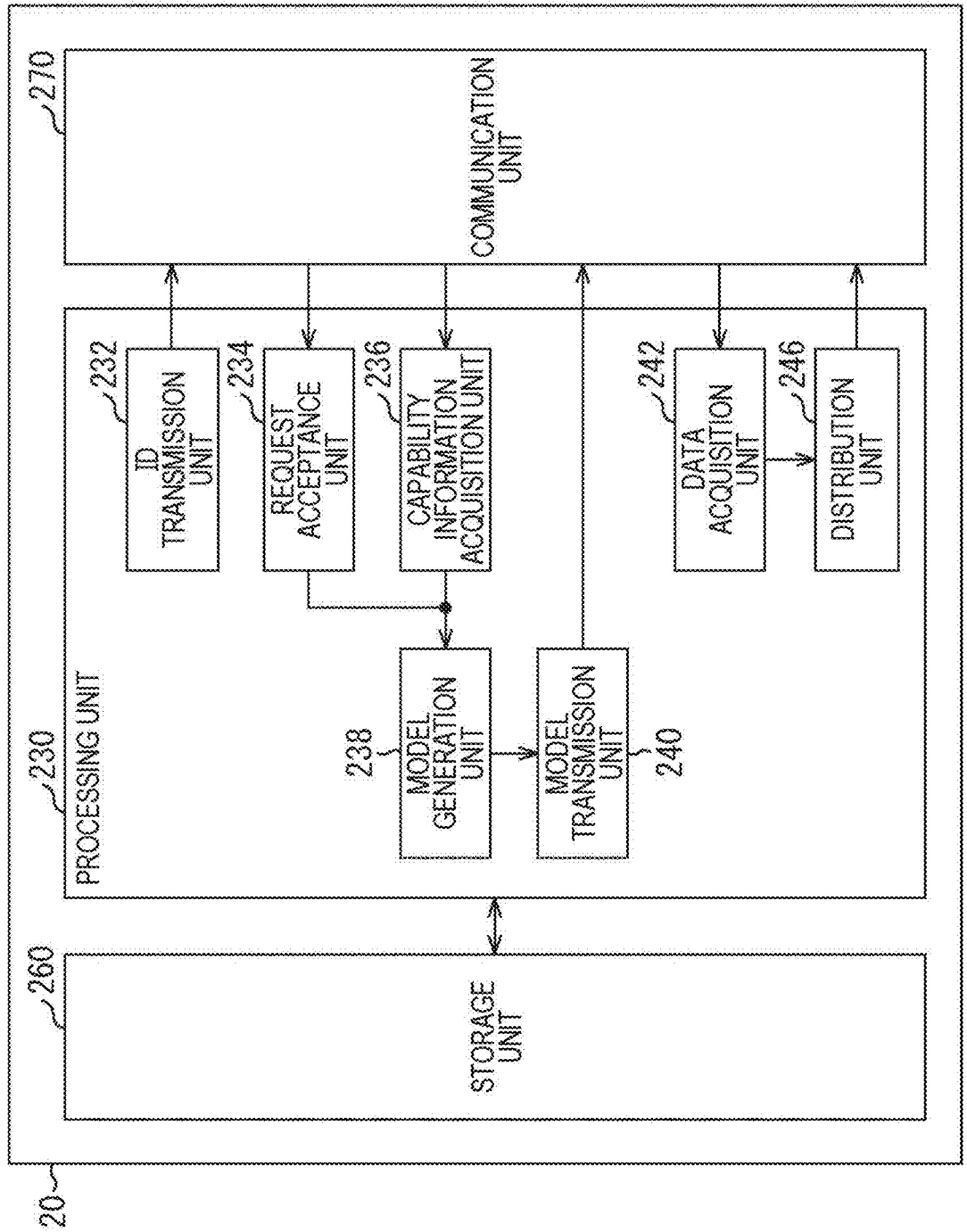
FIG. 3 is a diagram depicting a configuration example of a service server.

Next, a detailed configuration of the service server 20 according to the present embodiment will be described with reference to FIG. 3. FIG. 3 is a block diagram depicting a functional configuration example of the service server 20 according to the present embodiment. Specifically, as depicted in FIG. 3, the service server 20 mainly includes a processing unit 230, a storage unit 260, and a communication unit 270. Hereinafter, each functional block of the service server 20 will be sequentially described.

The processing unit 230 has a function of acquiring a distribution request from the user device 30 via the communication unit 270 as described later, generating a recognition model in response to the acquired distribution request, and transmitting the generated recognition model to the sensor device 10. The processing unit 230 is achieved by, for example, a processing circuit such as a CPU or a GPU, a ROM, a RAM, and the like. Specifically, as depicted in FIG. 3, the processing unit 230 mainly includes an ID transmission unit 232, a request acceptance unit 234, a capability information acquisition unit 236, a model generation unit 238, a model transmission unit 240, a data acquisition unit 242, and a distribution unit 246. Hereinafter, details of each functional unit included in the processing unit 230 will be described.

The ID transmission unit 232 transmits authentication information (ID) of the service server 20 to the authentication server 40 via the communication unit 270 as described later. The authentication information is used when the authentication server 40 determines whether or not the service server 20 has authority to be provided with the service of the data distribution system 1 according to the present embodiment. The data distribution system 1 according to the present embodiment ensures the security of the data distribution system 1 by such authentication.

The request acceptance unit 234 receives a distribution request from one or a plurality of the user devices 30 via the communication unit 270 as described later, and outputs the received distribution request to the model generation unit 238 as described later. Note that the request acceptance unit 234 may integrate common distribution requests and output the integrated distribution request.

The capability information acquisition unit 236 acquires in advance capability information indicating a sensing capability (type, accuracy, position, range, granularity, and the like of sensing) and a calculation capability of each of the sensor devices 10 via the communication unit 270 as described later, and outputs the acquired capability information to the model generation unit 238 as described later. Note that it is preferable that the capability information acquisition unit 236 acquires the capability information again when the function of the sensor device 10 or the like is updated.

Then, in the model generation unit 238 as described later, a recognition model corresponding to a capability of each of the sensor devices 10 is generated on the basis of the capability information of each of the sensor devices 10. Therefore, since the capability information is acquired again when the function of the sensor device 10 or the like is updated according to the present embodiment, the recognition model can be updated to be suitable for the capability of each of the sensor devices 10 at a current time point.

The model generation unit 238 can generate a recognition model corresponding to a distribution request by machine learning in accordance with the capability of each of the sensor devices 10 on the basis of the distribution request from the request acceptance unit 234 and capability information from the capability information acquisition unit 236. Moreover, the model generation unit 238 can output the generated recognition model to the model transmission unit 240 as described later.

Note that the model generation unit 238 may acquire data necessary for the machine learning from the user device 30 or another server (not illustrated). Since the model generation unit 238 can generate the recognition model suitable for each of the sensor devices 10, the recognition in the sensor device 10 can be achieved. Furthermore, since it is also possible to acquire the capability information again and to generate the recognition model again when the function of the sensor device 10 or the like is updated, it is possible to improve the recognition in the sensor device 10 by dynamically changing the recognition model.

Furthermore, the model generation unit 238 may cause a recognition model to include information (for example, information regarding teacher data used at the time of generating the recognition model or the like) regarding data used in the machine learning of the model generation unit 238. The information is used when the pre-processing unit 138 of the sensor device 10 performs pre-processing such that sensing data has a form close to the recognition model. Moreover, the model generation unit 238 cause a recognition model to include setting information regarding a setting of the sensor unit 100 of the sensor device 10 in order to acquire sensing data required to generate distribution data specified by a distribution request on the basis of capability information of the sensor device 10 Note that the model generation unit 238 may be provided as a device separate from the service server 20, and is not particularly limited.

The model transmission unit 240 transmits recognition models acquired from the above-described model generation unit 238 to the sensor devices 10 respectively corresponding to the recognition models via the communication unit 270.

The data acquisition unit 242 acquires distribution data corresponding to a distribution request from the sensor device 10 via the communication unit 270 as described later, and outputs the acquired distribution data to the distribution unit 246 as described later. Note that the data acquisition unit 242 is not necessarily provided in a case where the distribution data is directly transmitted from the sensor device 10 to the user device 30.

The distribution unit 246 distributes distribution data acquired by the above-described data acquisition unit 242 to the user device 30 corresponding to a distribution request via the communication unit 270 as described later. Note that the distribution unit 246 is not necessarily provided in a case where the distribution data is directly transmitted from the sensor device 10 to the user device 30.

The storage unit 260 stores programs, information, and the like configured for the processing unit 230 to execute various processes, and information obtained by the processes. Note that the storage unit 260 is achieved by a storage device, for example, an HDD and the like.

The communication unit 270 can transmit and receive information to and from an external device such as the sensor device 10 or the user device 30. In other words, the communication unit 270 can be said to be a communication interface having a function of transmitting and receiving data. Note that the communication unit 270 is achieved by a communication device (not illustrated) such as a communication antenna, a transmission/reception circuit, or a port.

Regarding Recognition According to Present Embodiment

Figure 4:
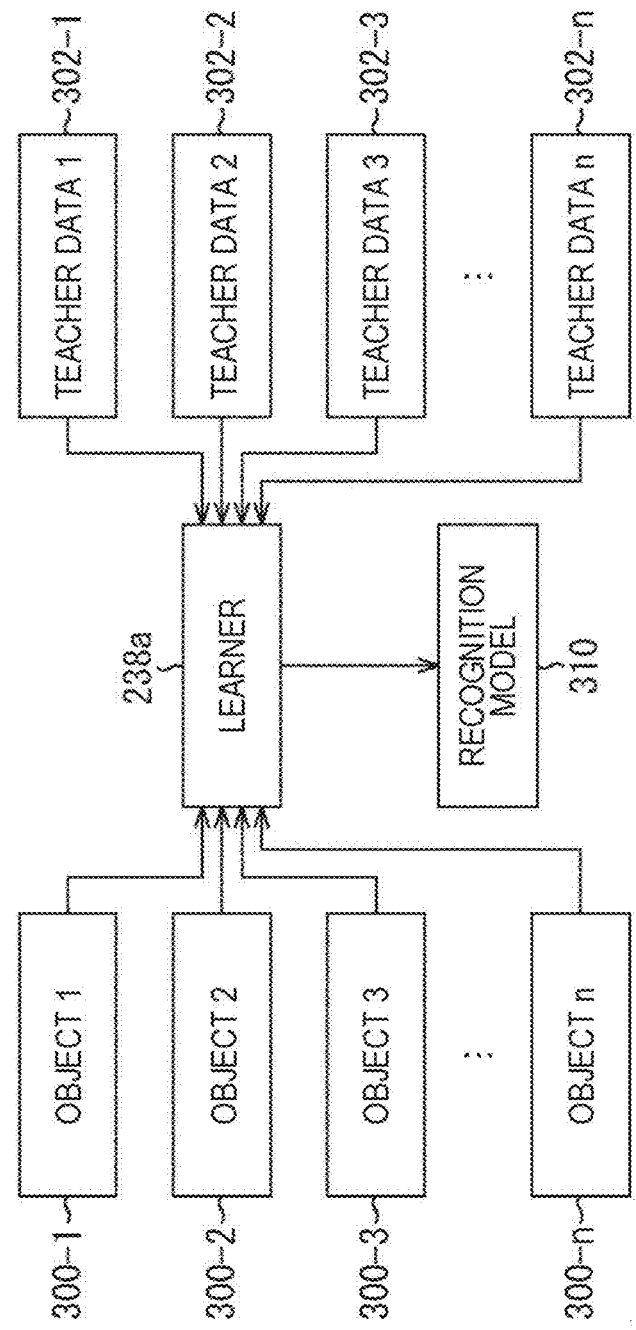
FIG. 4 is a diagram for explaining generation of a recognition model.

Next, an example of recognition according to the present embodiment will be described with reference to FIGS. 4 to 6. FIG. 4 is an explanatory diagram for describing an example of generation of a recognition model 310 according to the present embodiment; FIG. 5 is an explanatory diagram for describing examples of distribution data according to the present embodiment; and FIG. 6 is an explanatory diagram for describing examples of pre-processing according to the present embodiment.

Generation of a model used in the recognition according to the present embodiment will be described. As described above, a recognition model is generated by the model generation unit 238 of the service server 20. As depicted in FIG. 4, the model generation unit 238 described above includes, for example, a supervised learner 238a such as a support vector regression or a deep neural network.

10 For example, a plurality of pieces of teacher data 302-1 to 302-n, which are pieces of information regarding objects each of which is designated by a distribution request and is a target whose distribution is requested, is input to the learner 238a. Then, the learner 238a can generate the recognition model 310 used for the recognition by the recognition unit 142 of the sensor device 10 by performing machine learning on the plurality of pieces of input teacher data 302-1 to 302-n.

Since the plurality of sensor devices 10 has mutually different sensing capabilities and calculation capabilities, that is, have mutually different recognizable capabilities, it is preferable that the learner 238a generate each of the recognition models 310 according to capability information of each of the above-described sensor devices 10. Therefore, even if the plurality of sensor devices 10 having various specifications is included, the recognition model 310 according to the capability of each of the sensor devices 10 can be generated, and thus, the recognition can be performed by each of the sensor devices 10.

More specifically, for example, the learner 238a described above receives the inputs of the teacher data 302-1 to 302-n, which are respectively labeled with objects 300-1 to 300-n each of which is designated by a distribution request and is a target whose distribution is requested, regarding the objects. Then, the learner 238a extracts characteristic points and characteristic amounts of the objects from the plurality of pieces of teacher data 302-1 to 302-n by machine learning using a convolutional neural network or the like. Information such as the characteristic point extracted in this manner is the recognition model 310 for recognizing whether or not information of the object is included in sensing data acquired by each of the sensor devices 10.

Here, the generation of the recognition model 310 according to the present embodiment will be described with a specific example. For example, a description will be given regarding a case where it has been requested to search for a predetermined person (object) using an image (sensing data) acquired by the sensor device 10 through a distribution request from a user (a case where distribution data is position information of the predetermined person).

The service server 20 acquires a plurality of images of the predetermined person from the user device 30 that has transmitted the distribution request described above or a server (not illustrated) as a plurality of pieces of teacher data 302 used at the time of generating the recognition model 310. Then, as depicted in FIG. 4, the service server 20 inputs the plurality of acquired images (teacher data) 302-1 to 302-n to the learner 238a with labels of predetermined persons (objects) 300-1 to 300-n attached thereto. Moreover, the learner 238a extracts characteristic points and characteristic amounts of images of the predetermined person (object) 300 from the plurality of images (teacher data) 302-1 to 302-n by machine learning using the plurality of images (teacher data) 302-1 to 302-n, and generates the recognition model 310 for recognizing an image of the predetermined person (object) 300 from the image (sensing data).

Note that, similarly to the above example, in a case where it has been requested to search for a predetermined person (object) using sensing data (here, a type of sensing data is not particularly limited) acquired by the sensor device 10 through the distribution request from a user, the learner 238a may generate the recognition model 310 in accordance with the type of sensing data that can be acquired by each of the sensor devices 10.

More specifically, the learner 238a generates the recognition model 310 for recognizing an image of the predetermined person from an image for the sensor device 10 capable of acquiring the image, and generates the recognition model 310 for recognizing a sound of the predetermined person from an environmental sound is generated for the sensor device 10 capable of acquiring the environmental sound. Therefore, even if the plurality of sensor devices 10 having various specifications is included, the recognition model 310 according to the capability of each of the sensor devices 10 can be generated, and thus, the recognition can be performed by each of the sensor devices 10.

Furthermore, as described above, the recognition model 310 may include information regarding the teacher data 302 used in the machine learning. Here, the information regarding the teacher data 302 can be a type (for example, an image, a sound, or the like) of the teacher data 302 and quality (a distortion compensation level, a pixel defect, white balance, an image size, chroma, brightness, gamma, contrast, an edge enhancement level, focus, an exposure level, resolution, a dynamic range, a noise reduction level, or the like) of the teacher data.

Such information regarding the teacher data 302 can be used when the pre-processing unit 138 of the sensor device 10 described above performs pre-processing such that the acquired sensing data has a form close to the recognition model (specifically, the teacher data 302). Accordingly, the recognition accuracy in the recognition unit 142 of the sensor device 10 can be improved.

Furthermore, as described above, the recognition model 310 may include setting information regarding a setting of the sensor unit 100 of the sensor device 10 in order to acquire sensing data required to generate distribution data specified by a distribution request. Here, the setting information can be a type (for example, an image, a sound, or the like) of sensing data and a setting value (a distortion compensation level, white balance, an image size, chroma, brightness, gamma, contrast, an edge enhancement level, focus, an exposure level, resolution, a dynamic range, a noise reduction level, or the like) of the sensor unit 100 in accordance with desired quality of sensing data. Such setting information is used at the time of setting the sensor unit 100, and makes it possible to acquire sensing data suitable for the recognition model 310, and eventually, the recognition accuracy in the recognition unit 142 can be improved.

Note that the learner 238a may be provided in a server separate from the service server 20, and is not particularly limited. Moreover, a learning method in the learner 238a is not limited to the above-described method, and another method may be used.

<Recognition Using Recognition Model>

Next, recognition using the above-described recognition model 310 will be described. As described above, the recognition model 310 is used when the recognition unit 142 of the sensor device 10 recognizes whether or not sensing data or pre-processed sensing data corresponds to a distribution request. Here, the recognition according to the present embodiment will be described with a specific example.

For example, a description will be given regarding a case where it has been requested to search for a predetermined person (object) using an image (sensing data) acquired by the sensor device 10 through a distribution request from a user (distribution data is position information of the predetermined person). The sensor device 10 acquires the image from the sensor unit 100. Then, the recognition unit 142 refers to the recognition model 310 acquired from the service server 20, specifically, a characteristic point and a characteristic amount of an image of the predetermined person (object) 300, and recognizes whether or not the image of the predetermined person is included in the image acquired from the sensor unit 100. That is, since the recognition as described above is performed by the sensor device 10, the recognition can be performed immediately after acquisition of the image.

As described above, since the plurality of sensor devices 10 has mutually different sensing capabilities and calculation capabilities, that is, have mutually different recognizable capabilities, each of the recognition models 310 is generated according to capability information of each of the sensor devices 10, and each recognition is performed. For example, in a case where it has been requested to search for a predetermined person (object) using sensing data (here, a type of the sensing data is not particularly limited) acquired by the sensor device 10 through a distribution request from a user, in the present embodiment, the recognition unit 142 of the sensor device 10 capable of acquiring an image recognizes an image of the predetermined person from the image on the basis of the recognition model 310, and the recognition unit 142 of the sensor device 10 capable of acquiring an environmental sound recognizes a sound of the predetermined person from the environmental sound on the basis of the recognition model 310.

Note that the recognition unit 142 may be provided in a device separate from the sensor device 10, and is not particularly limited. Moreover, a recognition method in the recognition unit 142 is not limited to the above-described method, and another method may be used.

Next, examples of distribution data according to the present embodiment will be described with reference to FIG. 5. As described above, the data generation unit 144 of the sensor device 10 performs processing suitable for a corresponding distribution request on sensing data to generate distribution data. The distribution data can include at least one information of attribute information, quantity information, position information, state information, operation information, surrounding environment information, and prediction information of the object designated in the distribution request.

Furthermore, the distribution data can have a data format such as an image or text, and is not particularly limited. Moreover, the distribution data preferably includes identification information of a user who has transmitted the distribution request or the user device 30. That is, for example, the data generation unit 144 can extract only data regarding an object designated by the distribution request from the sensing data as the distribution data, abstract the data, or convert the data into text data in response to the distribution request.

In this manner, the distribution in real time can be implemented in which the data generation unit 144 processes the sensing data corresponding to the distribution request to generate the distribution data. Furthermore, in a case where sensing data does not correspond to a distribution request, the data generation unit 144 does not generate and transmit distribution data. Therefore, according to the present embodiment, a load of data transmission can be reduced as compared with a case where sensing data is transmitted regardless of whether or not the sensing data corresponds to a distribution request.

Furthermore, the data generation unit 144 can exclude information (for example, imaging of a person to the extent that the person can be specified) regarding the privacy included in the sensing data from the distribution data. Accordingly, the protection of the privacy is ensured. More specifically, in the uppermost example of FIG. 5, in a case where an image A of a road is acquired as sensing data corresponding to a distribution request, the data generation unit 144 extracts only a signboard sign or a crosswalk designated by the distribution request to generate distribution data A.

Furthermore, in the second example from the top of FIG. 5, in a case where an image B of a road is acquired as sensing data corresponding to a distribution request, the data generation unit 144 extracts only a sign or a vehicle, designated by the distribution request, on the road to generate distribution data B.

Furthermore, in the third example from the top of FIG. 5, in a case where an image C of a road is acquired as sensing data corresponding to a distribution request, the data generation unit 144 extracts only a sign or a puddle designated by the distribution request to generate distribution data C.

Moreover, in the lowermost example of FIG. 5, in a case where an image D of a road is acquired as sensing data corresponding to a distribution request, the data generation unit 144 extracts only a crosswalk designated by the distribution request or a person crossing the crosswalk to generate distribution data D.

Next, examples of pre-processing according to the present embodiment will be described with reference to FIG. 6. As described above, the recognition unit 142 can recognize whether or not sensing data corresponds to a distribution request using the recognition model 310 obtained by machine learning. Then, the pre-processing unit 138 of the sensor device 10 performs pre-processing such that the sensing data has a form close to the recognition model 310 on the basis of information regarding the above-described teacher data in order to improve the recognition accuracy in the recognition unit 142. Specifically, the pre-processing unit 138 performs the pre-processing on the sensing data such that a format, a distortion compensation level, a pixel defect, white balance, an image size, chroma, brightness, gamma, contrast, an edge enhancement level, focus, an exposure level, resolution, a dynamic range, a noise reduction level, or the like is equivalent to that of the teacher data 302.

More specifically, for example, in a case where each of images as depicted in the upper part of FIG. 6 is acquired as sensing data by the sensor unit 100 of the sensor device 10, the pre-processing unit 138 performs pre-processing on each of the image sin the upper part of FIG. 6 such that an image quality size and focus are equivalent to those of the teacher data 302. Then, the pre-processing unit 138 acquires each of images as depicted in the lower part of FIG. 6. In this manner, the pre-processing unit 138 performs the pre-processing so as to obtain the sensing data having a data level equivalent to that of the teacher data 302 used at the time of generating the recognition model 310 according to the present embodiment, whereby the recognition accuracy in the recognition unit 142 can be further improved.

Figure 7:
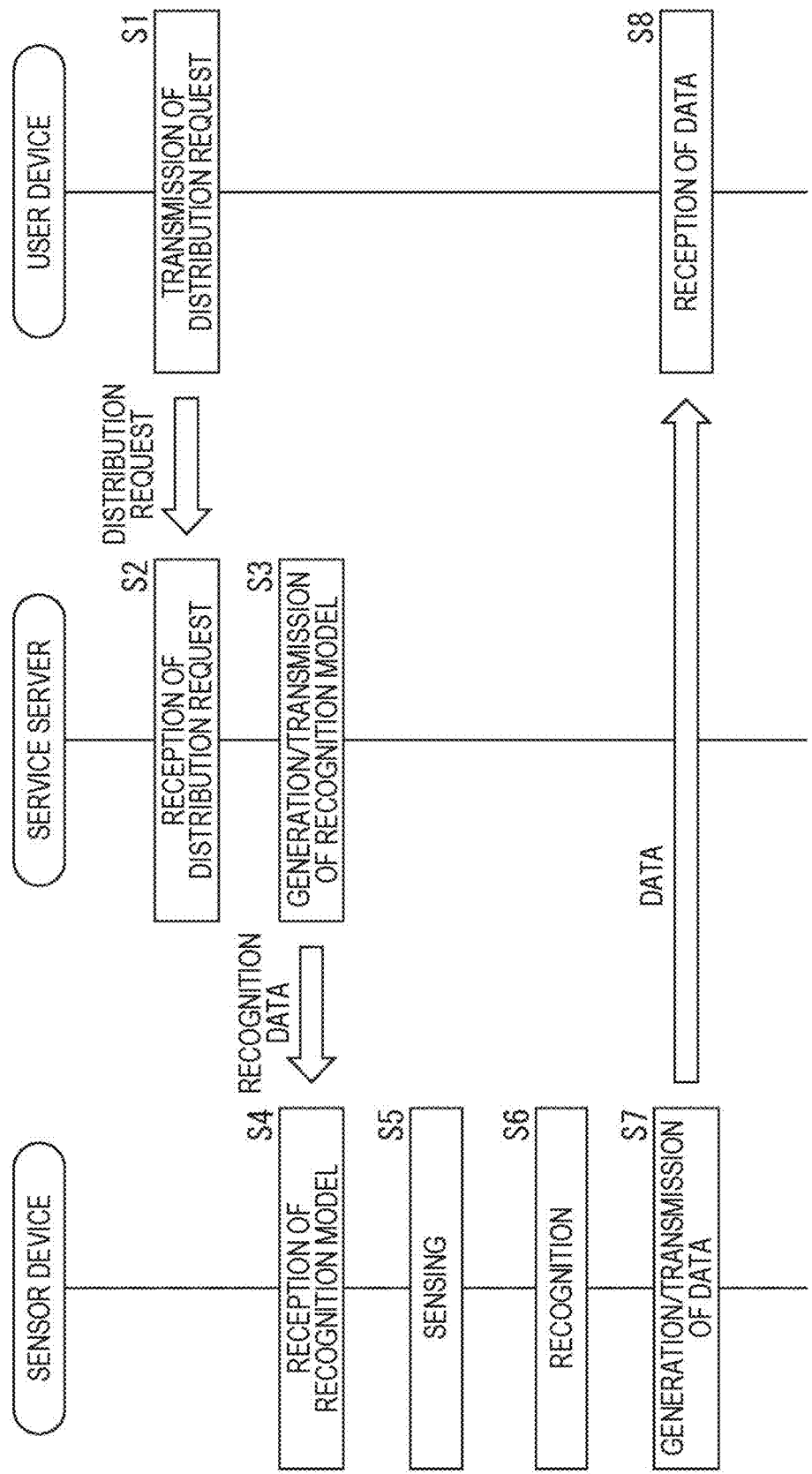
FIG. 7 is a diagram for explaining an example of an information processing method.

Next, an information processing method according to the embodiment of the present disclosure will be described with reference to FIG. 7. FIG. 7 is a sequence diagram depicting an example of the information processing method according to the present embodiment.

In step S1, the user device 30 receives information input from a user, and transmits the received information to the service server 20 as a distribution request. In step S2, the service server 20 receives the distribution request from the user device 30.

In step S3, the service server 20 generates a recognition model on the basis of the distribution request received in the above-described step S2, and transmits the generated recognition model to each of the sensor devices 10.

In step S4, the sensor device 10 receives the recognition model from the service server 20. Furthermore, in step S5, the sensor device 10 performs sensing to acquire sensing data. Moreover, in step S6, the sensor device 10 recognizes whether or not the sensing data acquired in the above-described step S5 corresponds to the distribution request on the basis of the recognition model received in the above-described step S4.

The sensor device 10 performs processing corresponding to the distribution request on the sensing data on the basis of recognition that the sensing data corresponds to the distribution request in the above-described step S6 to generate distribution data. Moreover, in step S7, the sensor device 10 directly transmits the generated distribution data to the user device 30 related to the distribution request.

Note that, instead of being directly transmitted, distribution data may be transmitted from the sensor device 10 to the user device 30 via the service server 20 as another embodiment.

In step S8, the user device 30 receives the distribution data transmitted from the sensor device 10.

As described above, it is possible to construct a framework in which various users can easily use information obtained from pieces of sensing data acquired by various sensor devices 10 according to the above-described present embodiment.

<Addition of Mode Switching Function>

As described above, the sensor device 10 is an imaging device (camera) mounted on a mobile body such as an automobile, an imaging device mounted on a smartphone carried by a user, or an imaging device such as a surveillance camera installed in a home, a store, or the like. In a case where the sensor device 10 is driven by a battery, there is a possibility that the sensor device 10 does not function due to a decrease in capacity of the battery. Furthermore, a CPU or a GPU that performs AI processing is likely to have heat, and there is a possibility that the sensor device 10 does not function normally when heat is generated too much.

In a case where the capacity of the battery of the sensor device 10 is a threshold or less, or in a case where the amount of heat generated by the processing unit 130 such as the CPU or the GPU is a threshold or more, switching is performed so as to cause the service server 20 to perform a part of processing that is being performed by the sensor device 10. Here, the description is continued by exemplifying a case where some or all of the AI functions of the sensor device 10 is performed by the service server 20.

A description will be added regarding a process of causing the service server 20 to perform a part of the processing of the sensor device 10 to suppress consumption of the battery of the sensor device 10 and to suppress heat generation of the processing unit 130.

Figure 8:
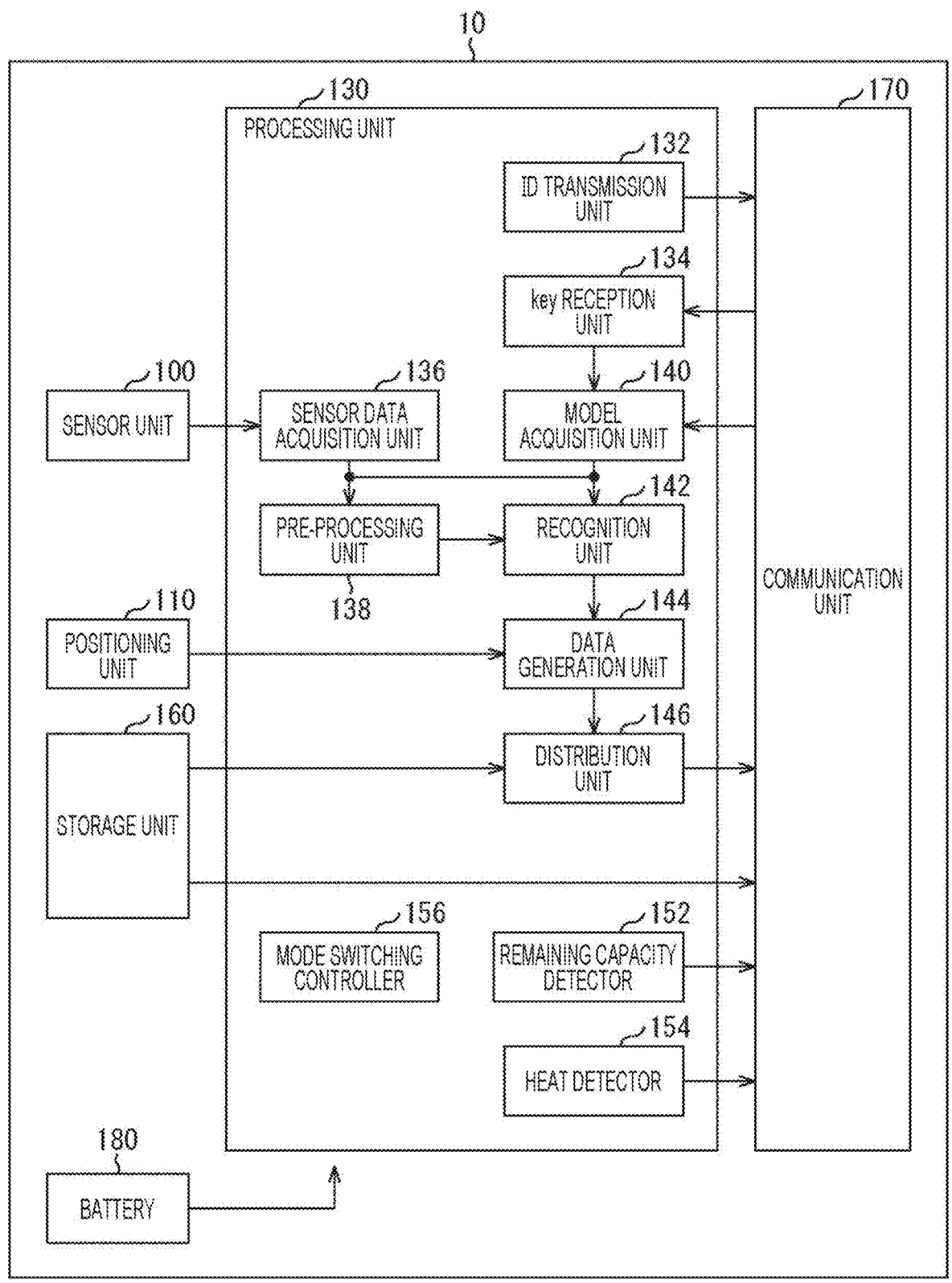
FIG. 8 is a diagram depicting another configuration example of the sensor device.

FIG. 8 depicts a configuration example of the sensor device 10 configured to perform such a process. The sensor device 10 depicted in FIG. 8 has a configuration in which a portion necessary for the following description is added to the configuration of the sensor device 10 depicted in FIG. 2. The sensor device 10 depicted in FIG. 8 has the configuration in which a battery 180 that supplies power to the respective units of the sensor device 10, a remaining capacity detector 152 that senses the remaining capacity of the battery 180, and a heat detector 154 that detects the amount of heat generated in the sensor device 10 are added. Furthermore, the sensor device 10 depicted in FIG. 8 has the configuration in which a mode switching controller 156 that performs processing at the time of switching a mode as described later is also added.

Figure 9:
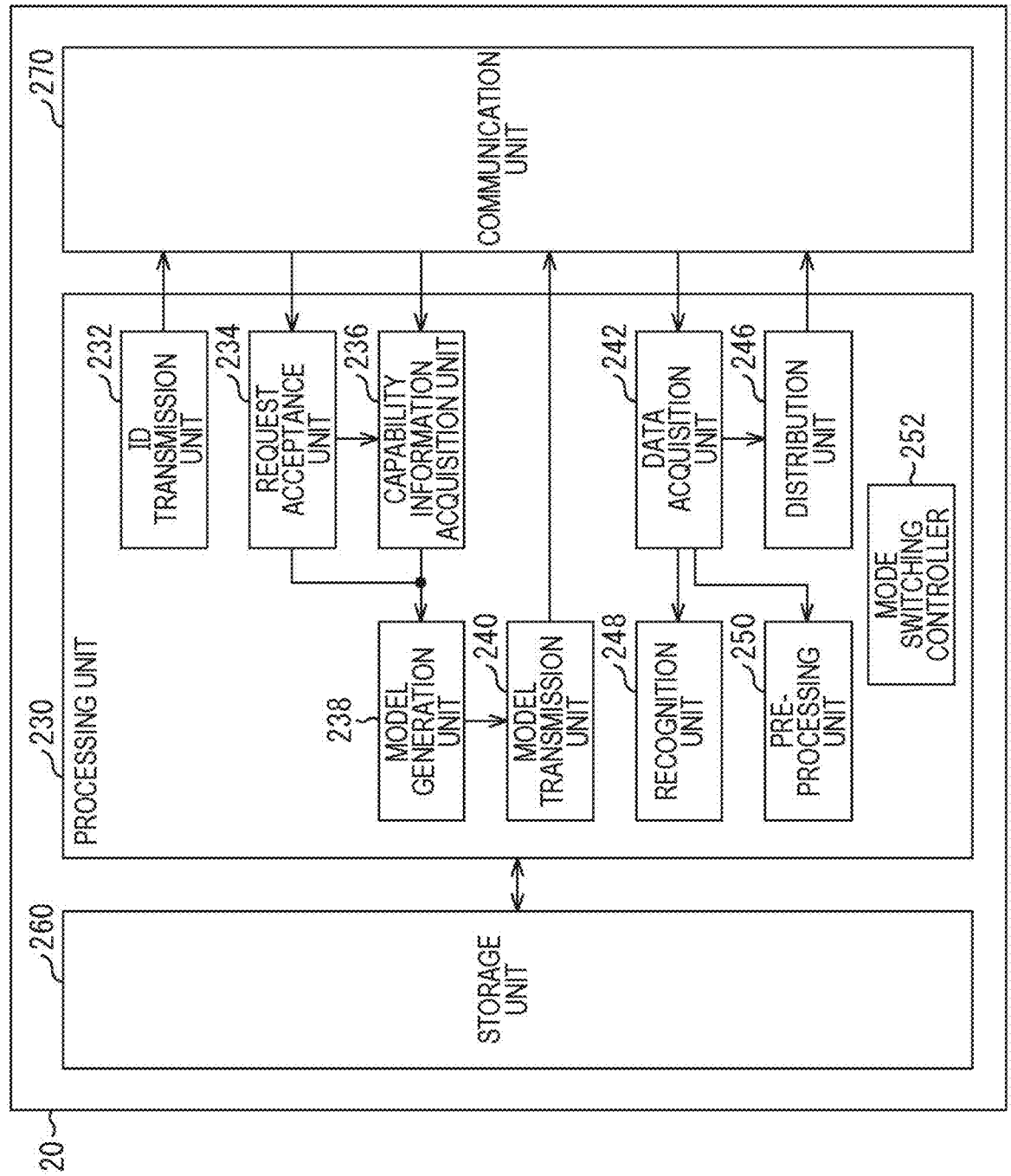
FIG. 9 is a diagram depicting still another configuration example of the service server.

FIG. 9 depicts a configuration example of the service server 20 in a case where a part of the processing on the sensor device 10 side can also be performed on the service server 20 side. The service server 20 depicted in FIG. 9 has a configuration in which a recognition unit 248 and a pre-processing unit 250 are added to the configuration of the service server 20 depicted in FIG. 3. The recognition unit 248 and the pre-processing unit 250 are functions of performing processing equivalent to that of the recognition unit 142 and the pre-processing unit 138 of the sensor device 10. Furthermore, the sensor device 10 depicted in FIG. 8 has the configuration in which a mode switching controller 252 that performs processing at the time of switching a mode as described later is also added.

Here, for example, in the case where the capacity of the battery 180 of the sensor device 10 is the threshold or less or in the case where the amount of heat generated in the sensor device 10 is the threshold or more, the service server 20 is caused to perform the processing performed by the recognition unit 142 of the sensor device 10. Furthermore, in a case where the capacity of the battery 180 has further decreased, the service server 20 is also caused to perform the processing performed by the pre-processing unit 138 of the sensor device 10. In order to describe such cases as examples, the service server 20 includes the recognition unit 248 and the pre-processing unit 250 as depicted in FIG. 9.

Since the configurations of the sensor device 10 and the service server 20 depicted in FIGS. 8 and 9 vary depending on what kind of functions are provided as the sensor device 10 and which functions among the functions of the sensor device 10 are performed on the service server 20 side, the configuration examples depicted in FIGS. 8 and 9 are examples and do not indicate limitation.

An example of a case where a part of the processing of the sensor device 10 is performed on the service server 20 side depending on the remaining capacity of the battery 180 of the sensor device 10 and the amount of heat generated in the processing unit 130 will be described with reference to FIGS. 10 and 11.

In the following description, a mode in which the sensor device 10 side performs the entire processing set to be performed on the sensor device 10 side is described as a sensor device priority mode. The sensor device priority mode is, for example, a mode in which processing using a recognition model is performed by the AI function of the sensor device 10.

A mode in which the service server 20 side performs a part of the processing set to be performed on the sensor device 10 side is described as a service server priority mode. The service server priority mode is a mode in which the sensor device 10 and the service server 20 share the AI function of the sensor device 10 to perform the processing using a recognition model.

Note that the description is continued here by exemplifying a case where the two modes exist, but multiple modes may be provided. A case where two or more modes are provided will be described later with reference to FIG. 12.

Figure 10:
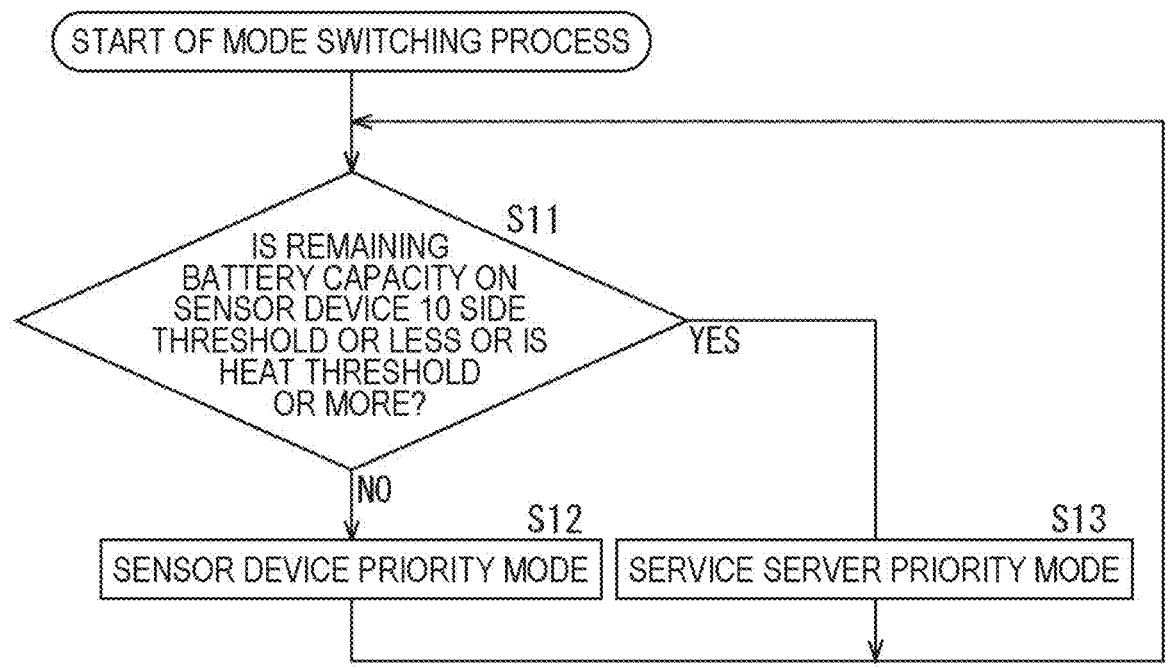
FIG. 10 is a flowchart for explaining a mode switching process.

FIG. 10 is a flowchart for explaining processing related to mode switching (mode transition) in a system configured by the sensor device 10 and the service server 20. FIG. 11 is a diagram depicting sharing states of functions of the sensor device 10 and the service server 20 in the sensor device priority mode and the service server priority mode.

In step S11, it is determined whether the remaining capacity of the battery 180 on the sensor device 10 side is the threshold or less, or whether the heat is the threshold or more. The remaining capacity detector 152 of the sensor device 10 detects the remaining capacity of the battery 180 and the mode switching controller 156 determines whether or not the remaining capacity is the threshold or less. Furthermore, the heat detector 154 of the sensor device 10 measures a temperature in the sensor device 10, and the mode switching controller 156 determines whether or not the temperature is a threshold or higher.

The mode switching controller 252 of the service server 20 can also be caused to perform the determination as to whether the remaining capacity of the battery 180 is the threshold or less and the determination as to whether the heat is the threshold or more as described later.

Furthermore, the description is continued here by exemplifying a case where the remaining capacity of the battery 180 and the heat of the processing unit 130 are monitored and the remaining capacity and the heat are compared with the thresholds, respectively, but the present technology can also be applied to a case where only one of the remaining capacity and heat is monitored and compared with the threshold. That is, the present technology may have one (the remaining capacity or the heat) or two factors (the remaining capacity and the heat) that trigger the mode switching. Moreover, it is a matter of course that the present technology can be applied even when there are two or more factors that trigger the mode switching.

Note that the heat detector 154 may be configured to directly measure a temperature (amount of heat generation) of each of parts (parts related to the AI functions) constituting the recognition unit 142 and the pre-processing unit 138, such as the CPU and the GPU, in other words, to measure only the heat of each of the CPU and the GPU, or may measure a temperature of the sensor device 10 (in this case, there is an influence of an outside air temperature, which is small though).

In step S11, in a case where it is determined that the remaining capacity of the battery 180 on the sensor device 10 side is not the threshold or less and the heat is not the threshold or more, the processing proceeds to step S12, and the sensor device priority mode is set. The upper part of FIG. 11 depicts the sensor device priority mode.

The sensor device 10 has a person detection function of executing a process of detecting a person. This person detection function is an AI function in which the pre-processing unit 138 and the recognition unit 142 detect a person from an image imaged by the sensor unit 100 on the basis of a recognition model acquired by the model acquisition unit 140. In the sensor device priority mode, the sensor device 10 detects a person by analyzing an image obtained by the sensor unit 100, and transmits coordinates at which the person has been detected as distribution data to the service server 20 via the communication unit 170.

The service server 20 acquires data regarding the coordinates of the person transmitted from the sensor device 10 side via the communication unit 270 by the data acquisition unit 242. The service server 20 processes the data regarding the coordinates of the person by a predetermined application. For example, a process of determining whether or not a person has intruded into an entry-prohibited area and notifying a predetermined user device 30 when it is determined that the person has intruded.

On the other hand, in a case where it is determined in step S11 that the remaining capacity of the battery 180 on the sensor device 10 side is the threshold or less and/or the heat is the threshold or more, the processing proceeds to step S13, and the service server priority mode is set. The lower part of FIG. 11 indicates the service server priority mode.

When the sensor device priority mode is switched to the service server priority mode, the sensor device 10 side transmits image data of the image imaged by the sensor unit 100 to the service server 20. In the service server priority mode, the sensor device 10 does not perform the processing in the pre-processing unit 138 and the recognition unit 142. Since the processing in the pre-processing unit 138 and the recognition unit 142 is not performed, it is possible to suppress power consumption of the battery 180 and to suppress the amount of heat generation.

The service server 20 acquires the image data from the sensor device 10 via the communication unit 270 by the data acquisition unit 242. In a case where the service server 20 implements the person detection function by the recognition unit 243 and the pre-processing unit 250, the image data acquired by the data acquisition unit 242 is supplied to the pre-processing unit 250. Then, the image data processed by the pre-processing unit 250 is supplied to the recognition unit 248. The pre-processing unit 2501 and the recognition unit 248 implement the person detection function by executing the processing similar to that of the pre-processing unit 138 and the recognition unit 142 on the sensor device 10 side. When detecting a person by the person detection function and detecting coordinates of the person, the service server 20 supplies data regarding the coordinates of the person by the application.

Figure 11:
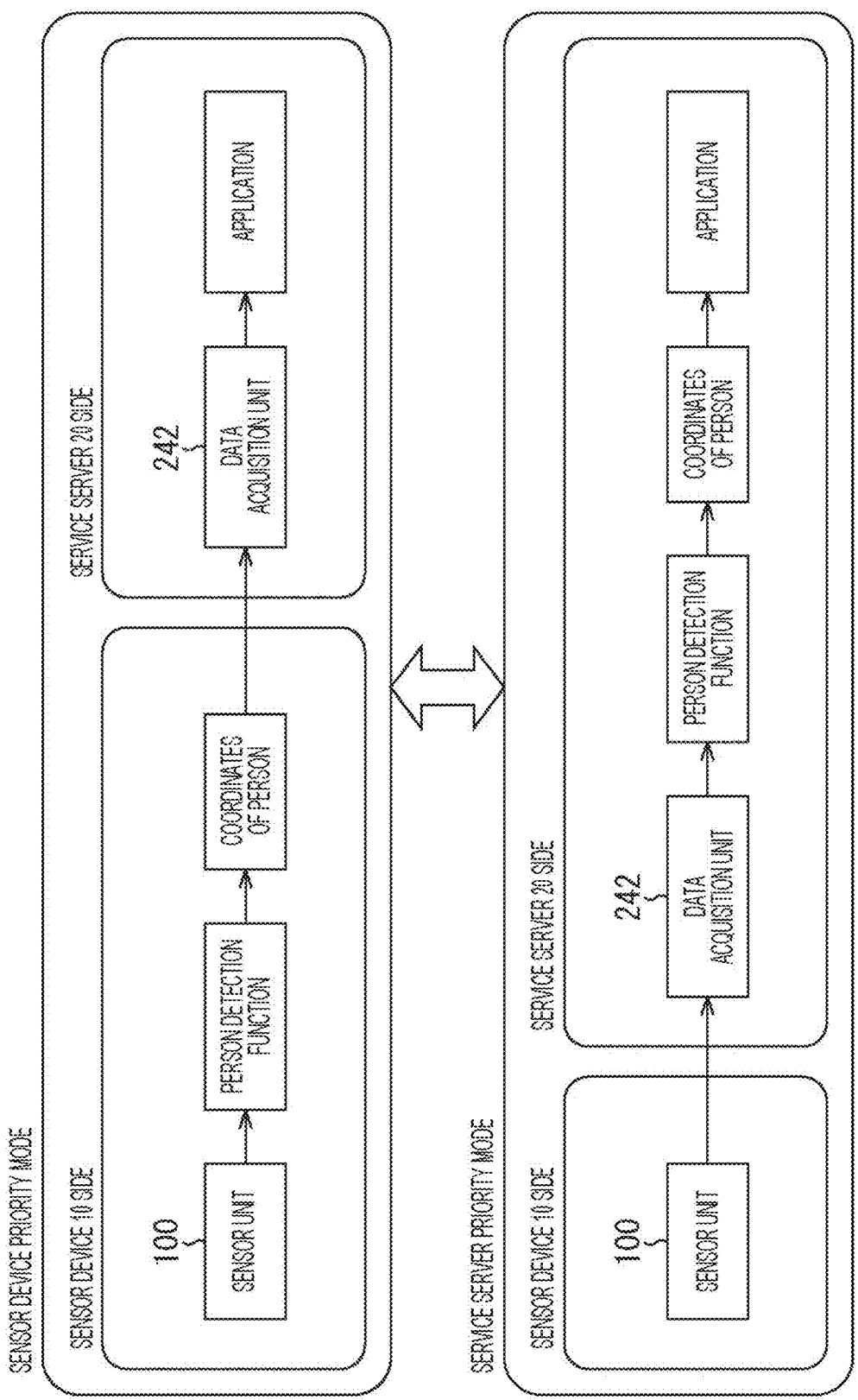
FIG. 11 is a diagram depicting an example of the mode switching.

In the example depicted in FIG. 11, in a case where the remaining capacity of the battery 180 of the sensor device 10 is the threshold or less or in a case where the amount of heat generation is the threshold or more, the mode is switched such that the processing by the person detection function (AI function) of the sensor device 10 is performed on the service server 20 side.

Note that in a case where it is determined that the remaining capacity has returned to the threshold or more due to charging or replacement of the battery 180 of the sensor device 10 or in a case where it is determined that the heat generation has subsided in the service server priority mode, the mode is returned to the sensor device priority mode.

<Transitions Among Multiple Modes>

Figure 12:
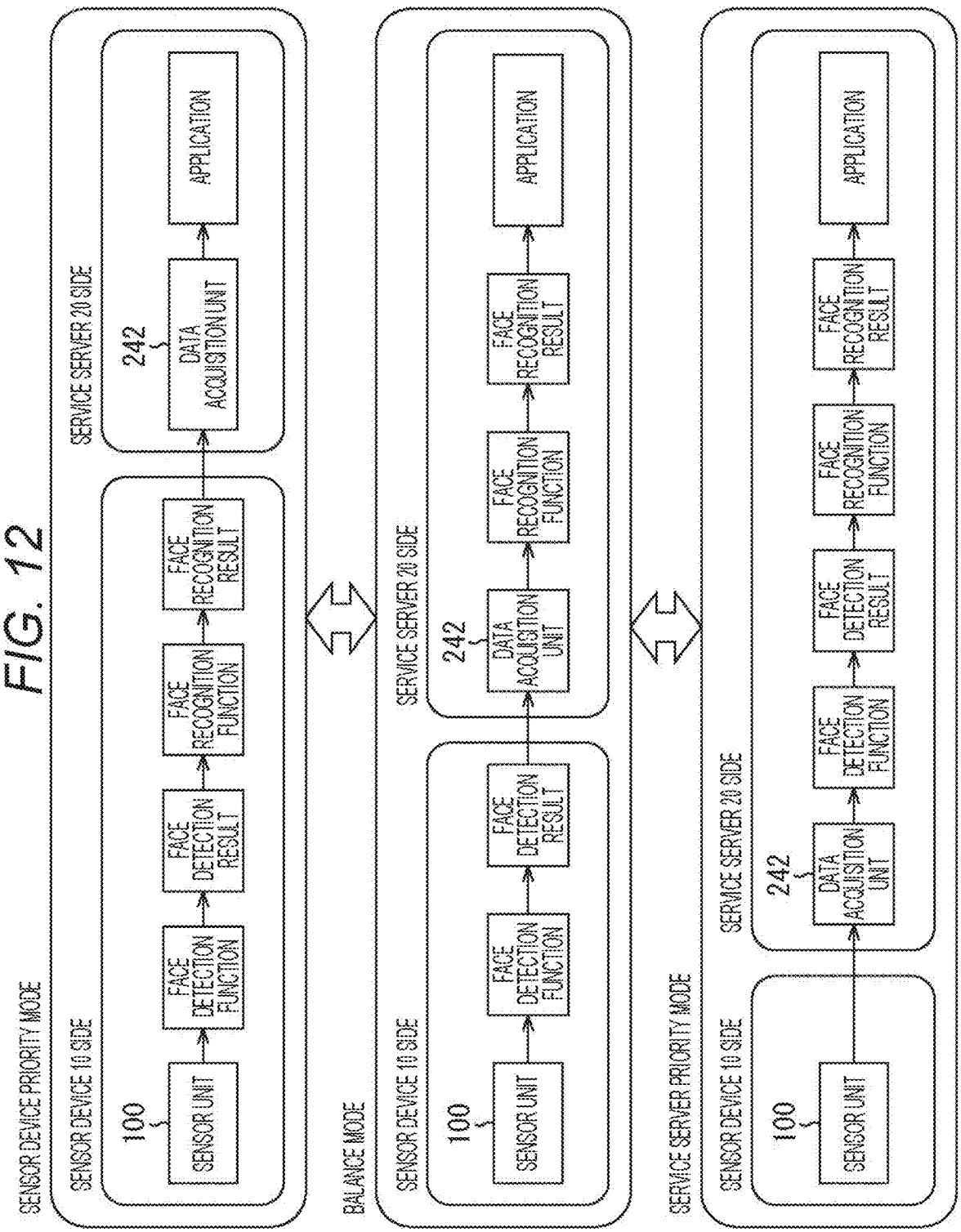
FIG. 12 is a diagram depicting an example of the mode switching.

A case where there are three modes will be additionally described with reference to FIG. 12. Modes depicted in FIG. 12 are the three modes of the sensor device priority mode, a balance mode, and the service server priority mode. The balance mode is a position with a mode between the sensor device priority mode and the service server priority mode.

A case is depicted in which the sensor device 10 has AI functions including a face detection function of detecting a face of a person from an image imaged by the sensor unit 100 and a face recognition function of recognizing the face detected by the face detection function in the sensor device priority mode.

For example, the face detection function can be implemented in the pre-processing unit 138 (FIG. 8), and provided as an AI function of extracting a region where a face is imaged from an image imaged by the sensor unit 100. Furthermore, for example, the face recognition function is a function of specifying a specific person, for example, whether or not the face detected by the face detection function (pre-processing unit 138) is a user A by being implemented in the recognition unit 142 (FIG. 8), and can be provided as an AI function of performing face authentication.

In the sensor device priority mode, the sensor device 10 detects a face from an image and outputs a face detection result by the face detection function. Furthermore, the sensor device 10 performs face recognition using the face detection result, and outputs a face recognition result by the face recognition function. Such a series of processes is performed on the sensor device 10 side in the sensor device priority mode, and the eventually output face recognition result is transmitted to the service server 20 side.

The service server 20 acquires data regarding the face recognition result transmitted from the sensor device 10 side via the communication unit 270 by the data acquisition unit 242. The service server 20 processes the data regarding the face recognition result by a predetermined application. For example, in a case where the face recognition result is a recognition result indicating the user A, it can be configured such that processing such as unlocking a room or turning on a light is performed.

When it is determined that the remaining capacity of the battery 180 on the sensor device 10 side of the sensor device 10 is the threshold or less or the heat is the threshold or more, the mode is switched to the balance mode. A state of the balance mode is depicted in the middle part of FIG. 12. As depicted in the middle part of FIG. 12, the processing related to the face recognition function of the sensor device 10, in other words, the processing performed by the recognition unit 142 is executed on the service server 20 side in the balance mode.

On the sensor device 10 side, processing until detecting a face from an image imaged by the sensor unit 100 is executed by the face detection function. Then, a face detection result is transmitted to the service server 20. The service server 20 acquires the face detection result by the data acquisition unit 242. The service server 20 performs face recognition by the face recognition function, in this case, the recognition unit 248 (FIG. 9). A face recognition result recognized by the face recognition function of the service server 20 is supplied to the application.

In the case of the balance mode, the face recognition function (processing performed by the recognition unit 142 (FIG. 8)) on the sensor device 10 side is performed on the service server 20 side. In other words, the sensor device 10 does not perform face recognition processing. Therefore, the sensor device 10 can reduce the power consumption of the battery 180 or the amount of heat generation of the processing unit 130 at least by an amount saved by not performing the face recognition.

In this manner, the balance mode is a mode in which what has been processed by the AI functions of the sensor device 10 is shared by the sensor device 10 and the service server 20.

Note that in a case where it is determined that the remaining capacity has returned to the threshold or more due to charging or replacement of the battery 180 of the sensor device 10 or in a case where it is determined that the heat generation has subsided in the balance mode, the mode is returned to the sensor device priority mode.

In a case where the remaining capacity of the battery 180 on the sensor device 10 side has further decreased or a case where the heat further increased, the balance mode transitions to the service server priority mode.

In the service server priority mode, the processing related to the face detection function of the sensor device 10, in other words, the processing performed by the pre-processing unit 138 is also executed on the service server 20 side. In further other words, the service server priority mode is a mode in which almost the entire processing performed by the AI functions on the sensor device 10 side is performed on the service server 20 side.

In the case of the service server priority mode, the sensor device 10 transmits image data of an image imaged by the sensor unit 100 to the service server 20. In the service server priority mode, the sensor device 10 does not perform the processing in the pre-processing unit 138 and the recognition unit 142. Since the processing in the pre-processing unit 138 and the recognition unit 142 is not performed, it is possible to suppress power consumption of the battery 180 and to suppress the amount of heat generation.

The service server 20 acquires the image data from the sensor device 10 via the communication unit 270 by the data acquisition unit 242. The service server 20 performs face detection by the face detection function, in this case, the pre-processing unit 250 (FIG. 9). Moreover, the service server 20 performs face recognition by the face recognition function, in this case, the recognition unit 248 (FIG. 9). A face recognition result recognized by the face recognition function of the service server 20 is supplied to the application.

In the case of the service server priority mode, the face detection function (processing performed by the pre-processing unit 138 (FIG. 8)) and the face recognition function (processing performed by the recognition unit 142 (FIG. 8)) on the sensor device 10 side are performed on the service server 20 side. In other words, the sensor device 10 does not perform face detection processing and the face recognition processing. Therefore, the sensor device 10 can reduce the power consumption of the battery 180 or the amount of heat generation of the processing unit 130 at least by an amount saved by not performing the face detection and the face recognition.

Note that in a case where it is determined that the remaining capacity has returned to the threshold or more due to charging or replacement of the battery 180 of the sensor device 10 or in a case where it is determined that the heat generation has subsided in the service server priority mode, the mode is returned to the balance mode or the sensor device priority mode.

Furthermore, a case where a mode transitions in the order of the sensor device priority mode, the balance mode, and the service server priority mode has been described as an example here, but the sensor device priority mode may transition to the service server priority mode in a case where the remaining capacity greatly decreases or the heat rapidly increases.

<Second Transition Among Multiple Modes>

An application may be provided on the sensor device 10 side. As described above, the sensor device 10 is equipped with the AI functions (achieved by the recognition unit 142 and the like), and is configured such that it is possible to recognize whether or not acquired sensing data corresponds to a request (distribution request) from a user on the basis of a recognition model transmitted from the service server 2. Further, it is also possible to mount the application on the sensor device 10 itself so as to perform a process of recognizing whether or not the sensing data acquired by the sensor device 10 corresponds to the request from the user by the sensor device 10 and presenting the result the sensor device 10.

Figure 13:
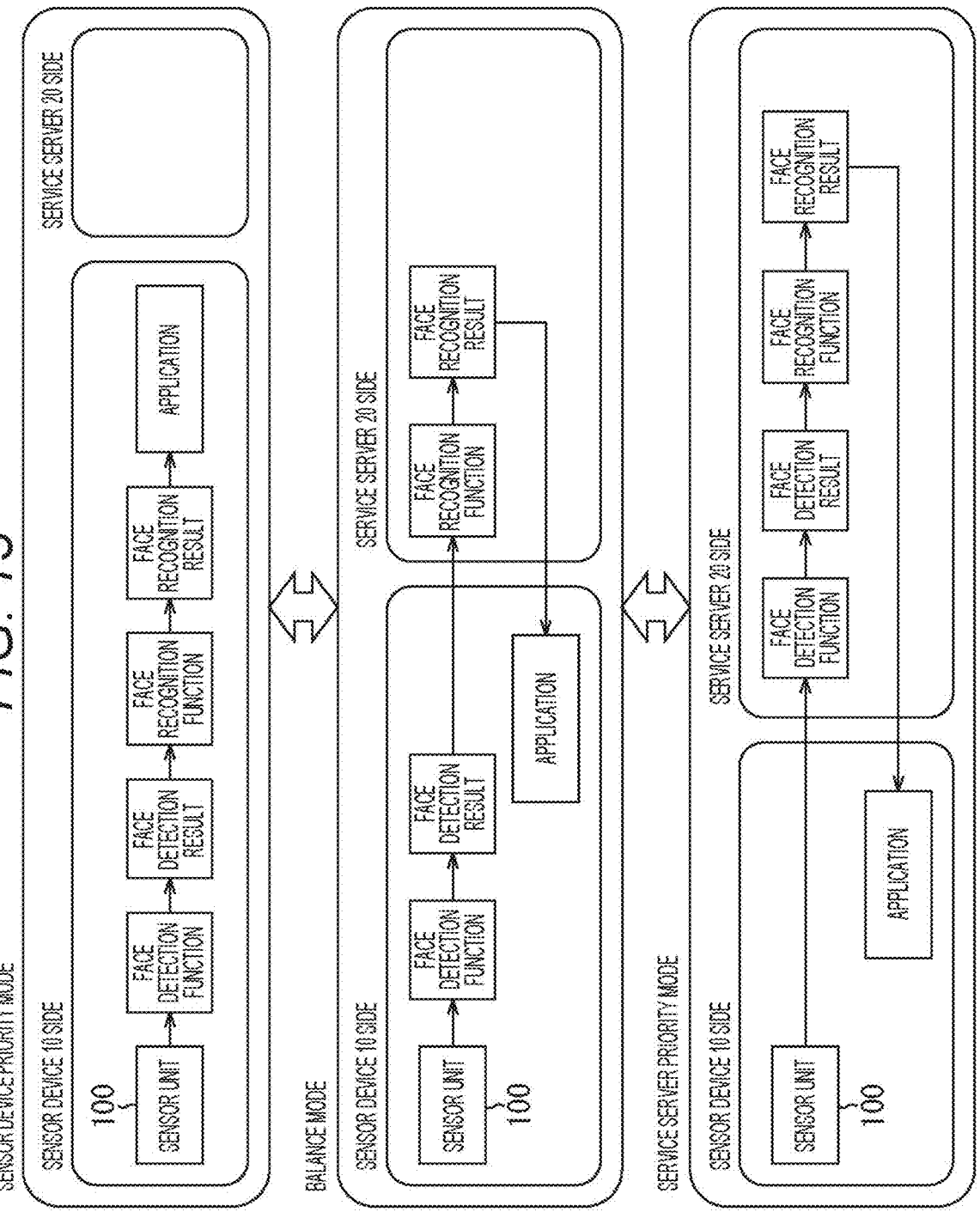
FIG. 13 is a diagram depicting an example of the mode switching.

FIG. 13 is a diagram depicting a case where transitions are made among the sensor device priority mode, the balance mode, and the service server priority mode similarly to FIG. 12. As depicted in the upper part of FIG. 13, the sensor device 10 has a predetermined application, and face recognition is performed by the AI functions of the face detection function and the face recognition function of the sensor device 10 in the sensor device priority mode similarly to the case of FIG. 12. Moreover, processing until a face recognition result is processed by the application is performed on the sensor device 10 side.

In the balance mode, face detection is performed by the face detection function of the sensor device 10, and a face detection result is transmitted to the service server 20 as depicted in the middle part of FIG. 13 similarly to the case depicted in the middle part of FIG. 12. The service server 20 activates the face recognition function and performs face recognition by the face recognition function. A face recognition result recognized by the face recognition function of the service server 20 is transmitted to the sensor device 10. The sensor device 10 processes the received face recognition result in the application.

In the service server priority mode, the sensor device 10 transmits image data obtained by the sensor unit 100 to the service server 20 as depicted in the lower part of FIG. 13 similarly to the case depicted in the lower part of FIG. 12. The service server 20 activates the face detection function and the face recognition function to perform face detection and face recognition. A face recognition result recognized by the face recognition function of the service server 20 is transmitted to the sensor device 10. The sensor device 10 processes the received face recognition result in the application.

In this manner, the sensor device 10 can also include the application, and processing can also be performed without interaction with the service server 20 in the sensor device priority mode. Furthermore, a processing result of the service server 20 can be returned to the sensor device 10 side in the balance mode or the service server priority mode.

The middle part of FIG. 13 depicts an example in which the face detection result is transmitted to the service server 20 and the face recognition result is transmitted to the sensor device 10. The image data acquired by the sensor unit 100 may be transmitted from the sensor device 10 to the service server 20, and the service server 20 may have the face detection function to perform the face detection. Furthermore, the service server 20 may transmit the face detection result to the sensor device 10, and the face recognition may be performed by the face recognition function on the sensor device 10 side.

Example in which Different Processing is Performed Depending on Mode

Figure 14:
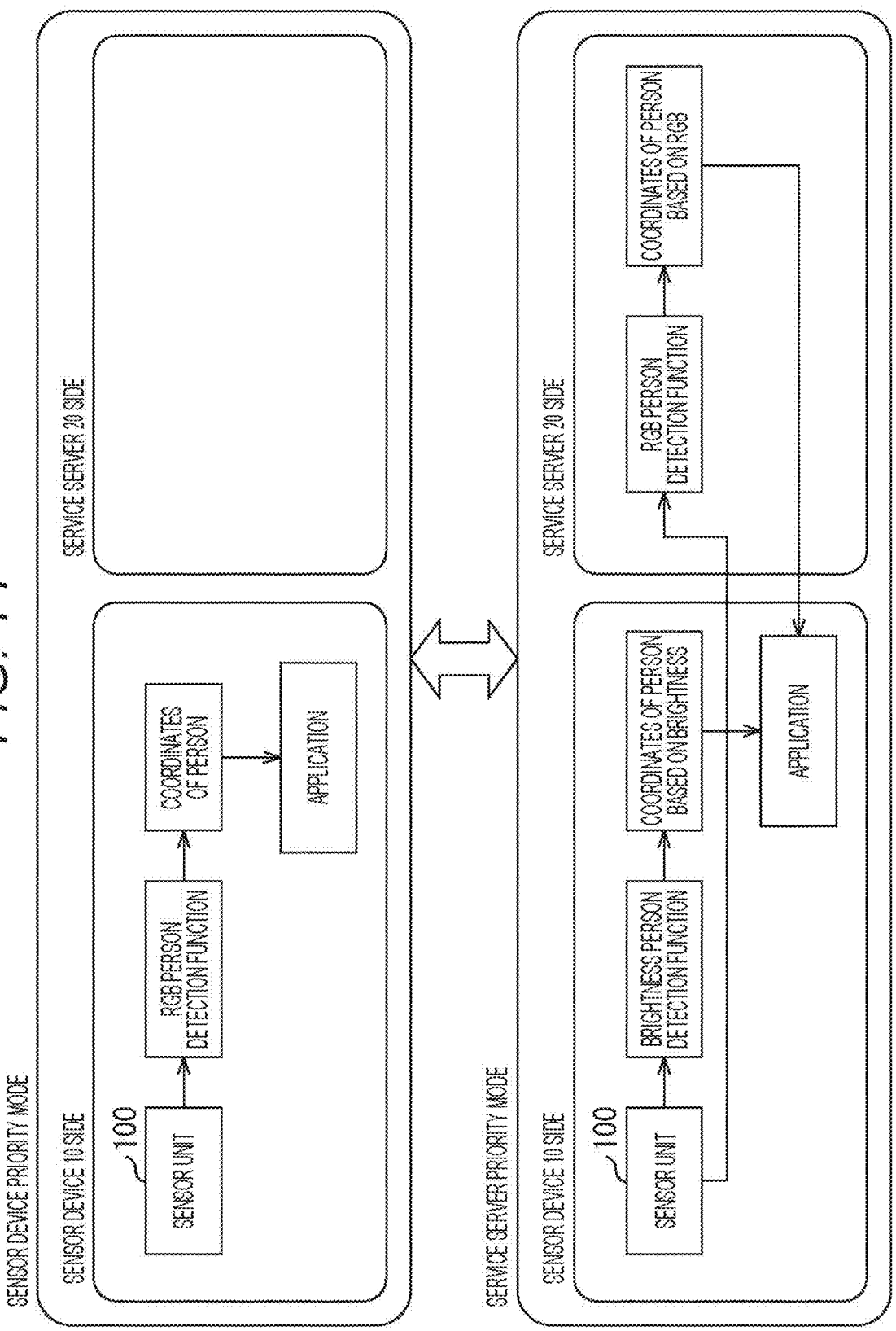
FIG. 14 is a diagram depicting an example of the mode switching.

FIG. 14 is a diagram for describing an example when different processing is executed in a different mode. The example depicted in FIG. 14 also depicts an example in which the sensor device 10 includes an application similarly to the example depicted in FIG. 13.

In the sensor device priority mode, the sensor device 10 activates an RGB person detection function to perform person detection as depicted in the upper part of FIG. 14. The RGB person detection function is an AI function that processes RGB (red, green, and blue) color images to perform the person detection. In the sensor device priority mode, that is, when there is the remaining capacity of the battery 180 and the amount of heat generation is small, the sensor device 10 processes the color images acquired by the sensor unit 100 to detect a person and acquire coordinates of the person. Furthermore, the sensor device 10 processes coordinates of the person by the predetermined application and executes predetermined processing.

In a case where the sensor device priority mode transitions to the service server priority mode, the sensor device 10 switches the AI function from the RGB person detection function to a brightness person detection function as depicted in the lower part of FIG. 14. The brightness person detection function is an AI function that performs person detection using a brightness component of an image acquired by the sensor unit 100 and outputs coordinates of the person based on the brightness to the application.

Furthermore, in the sensor device priority mode, image data of a color image acquired by the sensor unit 100 is transmitted to the service server 20. The service server 20 activates the RGB person detection function and detects a person by processing the image based on the received image data. Coordinates of the detected person in RGB are transmitted from the service server 20 to the sensor device 10. The application of the sensor device 10 performs processing by also using the coordinates of the person in RGB from the service server 20. In this case, the sensor device 10 performs person detection in gray scale to simply detect the person, and complements details by using the coordinates of the person in RGB from the service server 20.

The processing load is reduced and the power consumption of the battery 180 can be suppressed when the sensor device 10 performs the person detection using the brightness person detection function as compared with the time of performing the person detection using the RGB person detection function. As the mode transition is performed as described with reference to FIG. 14, the power consumption of the battery 180 can be suppressed in the service server priority mode as compared with the sensor device priority mode. Furthermore, it is considered that the heat generation also decreases if the processing is reduced, and thus, the amount of heat generation can be suppressed in the service server priority mode as compared with the sensor device priority mode.

In this manner, it is also possible to adopt a configuration in which processing of the sensor device 10 in the service server priority mode is processing with a lower processing load than that in the sensor device priority mode, and processing that compensates for the reduced processing is executed on the service server 20 side.

Note that data of a color image imaged by the sensor unit 100 is transmitted to the service server 20 in the service server priority mode, and an encryption process and a compression process may be performed during this transmission. In this case, there is a possibility that a processing load due to the encryption process and the compression process increases. For such a reason, there is also an embodiment in which data of a color image is not transmitted in the service server priority mode.

Another Example in which Different Processing is Performed Depending on Mode

Figure 15:
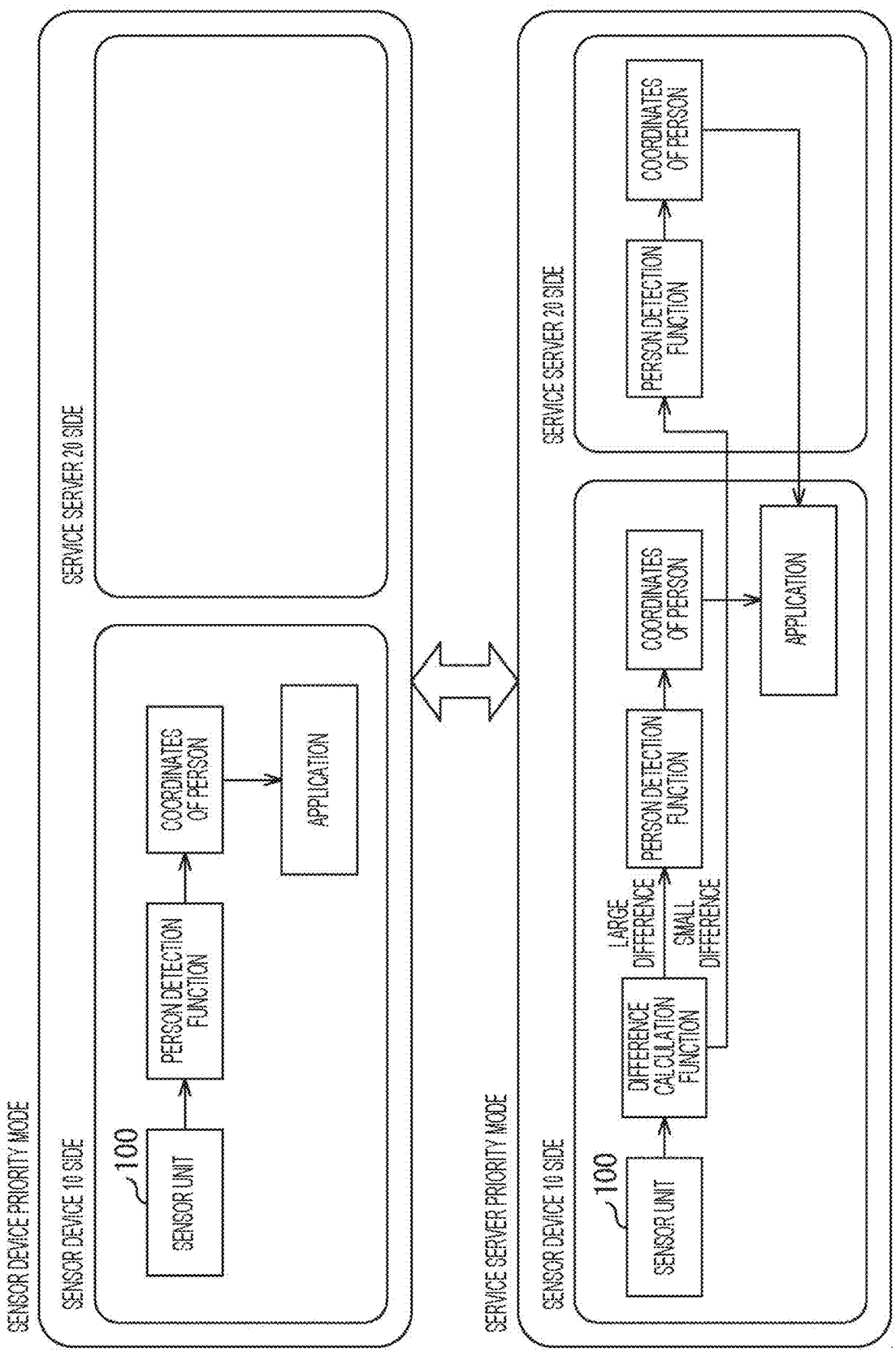
FIG. 15 is a diagram depicting an example of the mode switching.

FIG. 15 is a diagram for describing an example when different processing is executed in a different mode. The example depicted in FIG. 15 also depicts an example in which the sensor device 10 includes an application similarly to the example depicted in FIG. 14.

In the sensor device priority mode, the sensor device 10 activates the person detection function to detect a person as depicted in the upper part of FIG. 15. Data regarding coordinates of the person detected by the person detection function is supplied to the application. The sensor device 10 processes the coordinates of the person by the predetermined application and executes predetermined processing.

In a case where the sensor device priority mode transitions to the service server priority mode, the sensor device 10 activates a difference calculation function and divides the processing according to a calculation result by the difference calculation function as depicted in the lower part of FIG. 15. The difference calculation function calculates a difference between an image 1 acquired by the sensor unit 100 at a time t1 and an image t0 acquired at a time t0 before the time t1.

The difference calculation function calculates a difference by comparing a predetermined frame and an immediately previous frame. This difference can be used as an index indicating the degree of change between a situation imaged at the time t0 and a situation imaged at the time t1.

In a case where the difference is large, it can be estimated that the situation imaged at the time t1 has greatly changed from the situation imaged at the time to. When it is determined that the situation has changed in this manner, it is considered that it is preferable to output a detection result of the sensor device 10 as soon as possible. Thus, in a case where the difference calculated by the difference calculation function is large, a person is detected by the person detection function on the sensor device 10 side, and coordinates of the detected person are supplied to the application.

On the other hand, in a case where the difference is small, it can be estimated that the situation imaged at the time t1 has not changed so much from the situation imaged at the time t0. When it is determined that the situation has not changed so much as described above, it is considered that the necessity to output the detection result of the sensor device 10 as soon as possible is low. Thus, in the case where the difference calculated by the difference calculation function is small, image data is transmitted to the service server 20, person is detected by the person detection function on the service server 20 side, and coordinates of the detected person are supplied to the application of the sensor device 10.

Since the sensor device 10 performs the person detection only when the difference is large in the service server priority mode, the power consumption of the battery 180 can be suppressed as compared with a case of constantly performing the person detection, that is, the sensor device priority mode. Furthermore, it is considered that the heat generation also decreases if the processing is reduced, and thus, the amount of heat generation can be suppressed in the service server priority mode as compared with the sensor device priority mode.

In this manner, in the service server priority mode, the sensor device 10 can also be configured to select and execute either processing executed in the service server priority mode or processing reduced from the processing.

<Processing Related to Mode Transition>

Figure 16:
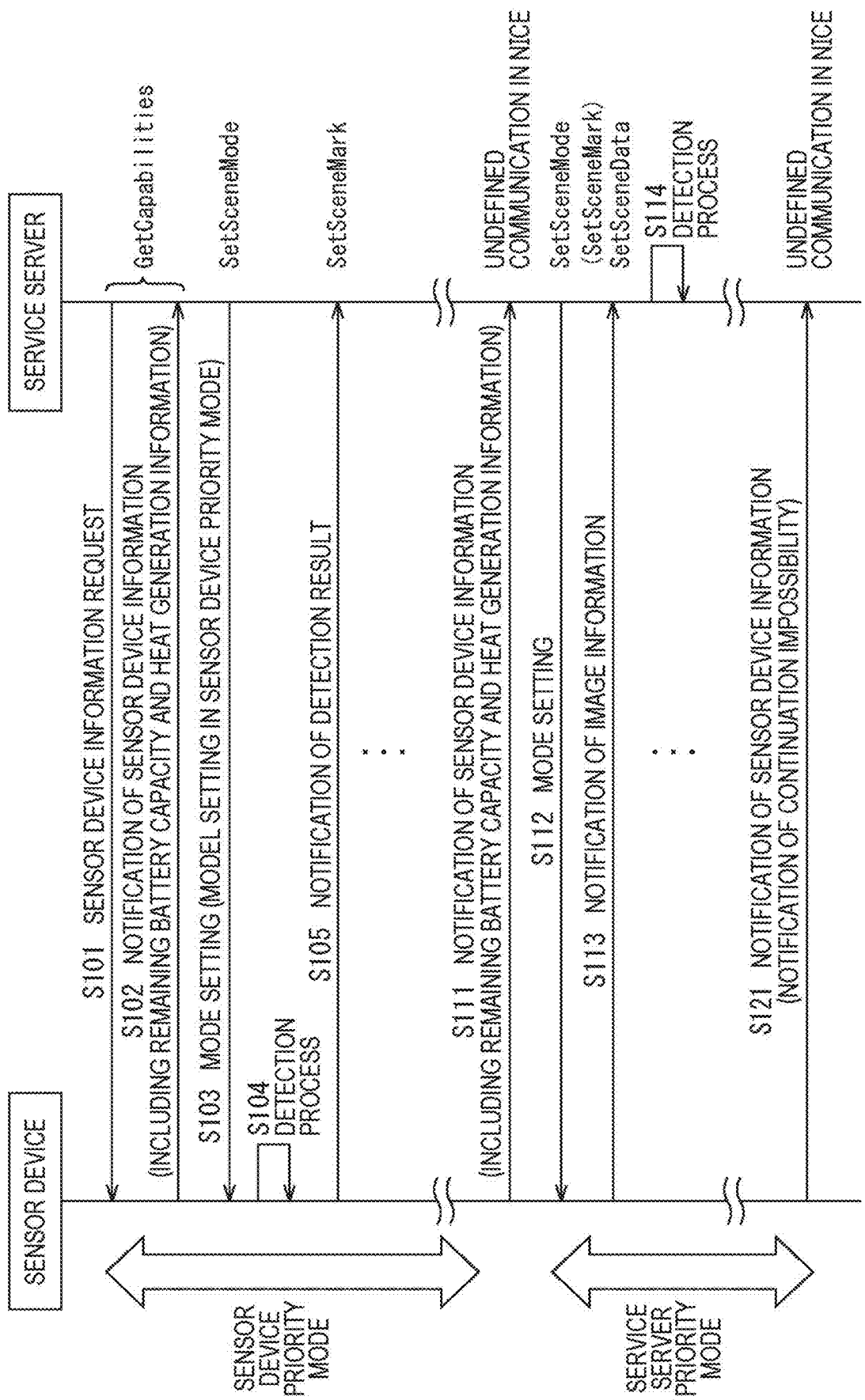
FIG. 16 is a flowchart for explaining an example of the information processing method.

A description will be further added regarding processing performed between the sensor device 10 and the service server 20 with reference to a flowchart of FIG. 16. In the description with reference to the flowchart of FIG. 16, the case where the mode transitions as described with reference to FIG. 11 will be described as an example.

Furthermore, in FIG. 16, an application programming interface (API) used when the specifications defined by the network of intelligent camera ecosystem (NICE) Alliance are applied is described on the right side of the drawing. This is a description indicating that the present technology can execute processing on the basis of the NICE standard, but is not a description indicating that an application range of the present technology is limited only to the NICE standard. That is, the present technology can be applied to the NICE standard, and can also be applied to standards other than the NICE standard.

In step S101, the service server 20 issues an information request to the sensor device 10. In response to this request, the sensor device 10 notifies the service server 20 of information regarding the sensor device 10 in step S102. In a case where transmission and reception of the information regarding the sensor device 10 executed in these steps S101 and S102 are performed on the basis of the NICE standard, an API called GetCapabilities is used.

The API called GetCapabilities is an API for inquiring capability of a device, and is, for example, an API for transmitting and receiving information such as whether there is a capability of capturing a moving image or a still image, whether JPEG, H.264, or the like can be handled as a format, or any corresponding SceneMode.

In a case where the present technology is applied, the information regarding the sensor device 10 transmitted and received using the API called GetCapabilities includes information regarding the remaining capacity of the battery 180 or the heat (temperature). When receiving the API called GetCapabilities from the service server 20, the sensor device 10 detects the remaining capacity of the battery 180 by the remaining capacity detector 152, and transmits information regarding the detected remaining capacity to the service server 20 together with other information. Furthermore, when receiving the API called GetCapabilities from the service server 20, the sensor device 10 measures the heat (temperature) of the sensor device 10 by the heat detector 154, and transmits information regarding the measured heat to the service server 20 together with other information.

In step S103, the service server 20 sets a mode. The service server 20 receives information regarding a capability and a state of the sensor device 10 from the sensor device 10, and sets an appropriate mode on the basis of the information. The set mode is the sensor device priority mode or the service server priority mode.

Furthermore, setting the mode also includes setting a recognition model used by the recognition unit 142 (FIG. 8). In other words, an AI function corresponding to the set mode is set.

In a case where the processing related to the mode setting executed in step S103 is performed on the basis of the NICE standard, an API called SetSceneMode is used. The API called SetSceneMode is an API for setting SceneMode, and SceneMode is person detection, moving object detection, or the like.

In step S104, the sensor device 10 performs a detection process using the set recognition model. For example, as described with reference to FIG. 11, the process of detecting a person from an image acquired by the sensor unit 100 is executed.

In step S105, the sensor device 10 transmits information detected in the detection process to the service server 20. The transmitted information is, for example, information regarding coordinates of the detected person.

In a case where the notification of the detection result executed in step S105 is performed on the basis of the NICE standard, an API called SetSceneMark is used. This API called SetSceneMark is an API for transmitting information applied to a trigger set in SetSceneMode when the trigger is applied. For example, in a case where person detection is set in SetSceneMode, meta information, such as a thumbnail and a time stamp when a person has been detected, is transmitted.

The detection process in step S104 and the notification process of the detection result in step S105 are repeatedly performed. While the detection process and the notification process are being repeatedly performed, the mode switching process described with reference to FIG. 10 is also performed. In step S11 of the flowchart described with reference to FIG. 10, when the mode switching controller 156 of the sensor device 10 determines that the remaining capacity of the battery 180 is the threshold or less or the heat is the threshold or more, it is determined to transition from the sensor device priority mode to the service server priority mode, and the mode transition is started.

When such a mode transition process is started, information regarding the sensor device 10 is notified in step S111 of the flowchart depicted in FIG. 15. Note that there is a plurality of embodiments depending on whether the mode transition process is started by an instruction from the sensor device 10 side or an instruction from the service server 20 side, and the like, and thus, details will be described later.

In step S111, information regarding the remaining capacity of the battery 180 and the heat of the sensor device 10 is transmitted from the sensor device 10 to the service server 20 in order to start the mode transition. An API for transmitting the information regarding the sensor device 10 from the sensor device 10 to the service server 20 in order to start such a mode transition is undefined communication in the NICE standard. When the API for performing such communication is newly defined in the NICE standard, it is possible to perform the communication related to the start of the mode transition in the NICE standard as well.

In step S112, the service server 20 sets a mode on the sensor device 10. The mode setting process in step S112 is basically performed similarly to the mode setting process in step S103. When receiving the information regarding the remaining battery capacity or the heat of the sensor device 10 from the sensor device 10, the service server 20 sets a mode suitable for the remaining battery capacity or the heat. In the example depicted in FIG. 16, the service server priority mode is set in step S112. In a case where the processing related to the mode setting in step S112 is performed on the basis of the NICE standard, an API called SetSceneMode can be used.

When switching to the service server priority mode in step S112, the sensor device 10 transmits image data acquired by the sensor unit 100 to the service server 20 and enters a mode in which a person detection process is not performed as described with reference to FIG. 11. Furthermore, the service server 20 side is set to a mode of receiving the image data from the sensor device 10, and performing the person detection process using the image data.

In step S113, the sensor device 10 notifies the service server 20 of the image data (image information). In a case where this notification is performed on the basis of the NICE standard, the API called SetSceneMark may be used, or an API called SetSceneData may be used. The SetSceneData is basically similar to the SetSceneMark, but is different in that the SetSceneData transmits data itself while the SetSceneMark transmits meta information.

In step S114, the service server 20 performs a detection process using the image information transmitted from the sensor device 10. The notification process of the image information in step S113 and the detection process in step S114 are repeatedly performed. Through the repetition, for example, the person detection process is continuously performed.

In step S121, the sensor device 10 notifies the service server 20 of information regarding the sensor device 10. This notification is a notification indicating that the continuation is impossible. When the sensor device 10 is operating in the service server priority mode, the remaining capacity of the battery 180 continues to decrease and is likely to eventually decrease up to the remaining capacity at which the operation is not possible if processing such as charging the battery 180 is not performed, for example.

In this manner, the sensor device 10 notifies the service server 20 that an operation-impossible state is likely to be formed before being turned into the operation-impossible state. When receiving such a notification, the service server 20 executes a process of notifying an administrator who manages the sensor device 10 of the state of the sensor device 10, for example.

Note that, a notification can be also issued in a case where the heat does not decrease or continues to increase in addition to a case where the remaining capacity of the battery is likely to be zero.

Furthermore, in addition to these, when a failure occurs, for example, when it becomes difficult to capture an image by the sensor unit 100, or the like, a notification may be issued as long as the notification can be issued.

In this manner, an API for issuing the notification from the sensor device 10 to the service server 20 in the state of being unable to operate normally or at the time of being likely to be in the state of being unable to operate normally is undefined communication in the NICE standard. When the API for performing such a notification is newly defined in the NICE standard, it is possible to perform a notification indicating a state where it is impossible to continue an operating state in the NICE standard as well.

<First Processing Related to Mode Transition>

Figure 17:
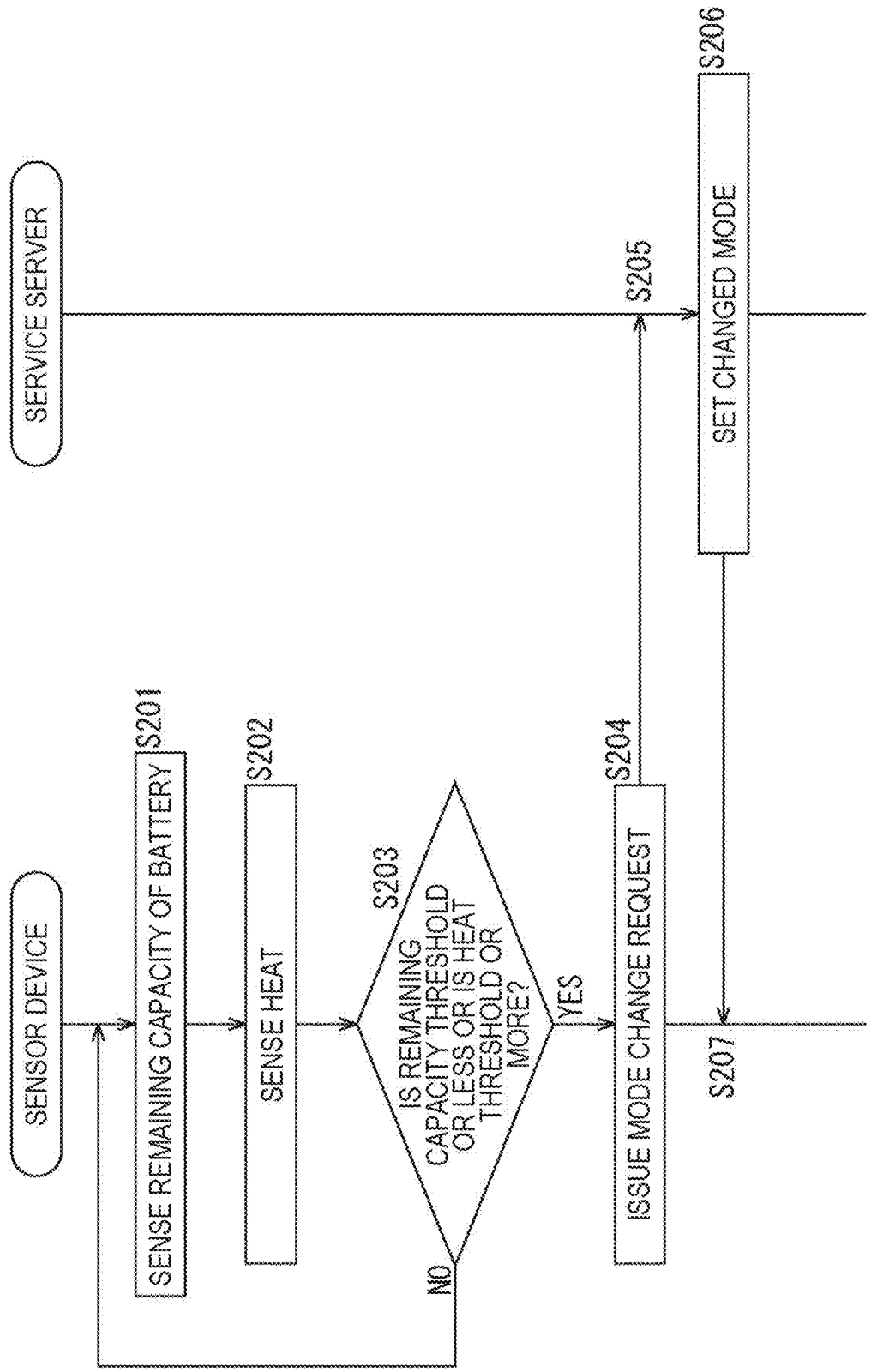
FIG. 17 is a diagram for explaining processing related to a start of the mode switching.

First processing related to the start of the mode transition will be described. FIG. 17 is a flowchart for describing processing in a case where an instruction (request) is issued from the sensor device 10 side to start the mode transition.

In step S201, the remaining capacity detector 152 of the sensor device 10 senses the remaining capacity of the battery 180. In step S202, the heat detector 154 senses the heat of the sensor device 10 (heat of the CPU or the GPU).

In step S203, the mode switching controller 156 determines whether or not the sensed remaining capacity is a threshold or less, or whether or not the heat is a threshold or more. Note that the threshold for the remaining capacity and the threshold for heat are different values. In a case where it is determined in step S203 that the sensed remaining capacity is the threshold or more and the heat is the threshold or less, the processing returns to step S201, and the processes in step S201 and subsequent steps are repeated.

The processes of steps S201 to S203 are repeatedly performed at a predetermined cycle. Here, a case where the process of step S203 is executed in the sensor device priority mode will be described as an example. Thus, it is described that whether or not the sensed remaining capacity is the threshold or less, or whether or not the heat is the threshold or more is determined in step S203. In a case where the process of step S203 is executed in the service server priority mode, the process of determining whether or not the sensed remaining capacity is the threshold or more and whether or not the heat is the threshold or less is executed.

Furthermore, in a case where there are multiple modes, comparison with a threshold suitable for a mode set at a time point when the process of step S203 is performed is performed to perform the determination as described with reference to FIGS. 12 and 13. That is, the threshold is set for each mode.

On the other hand, in a case where it is determined in step S203 that the sensed remaining capacity is the threshold or less and/or in a case where it is determined that the heat is the threshold or more, the processing proceeds to step S204.

In step S204, the sensor device 10 issues a mode change request to the service server 20. When receiving the mode change request from the sensor device 10 in step S205, the service server 20 sets a changed mode in step S206. In step S206, the service server 20 side is set to, for example, a state where recognition based on a recognition model executed by the sensor device 10 can be started, and a process of transmitting the recognition model corresponding to the set mode to the sensor device 10 is executed.

In step S207, the sensor device 10 receives the recognition model from the service server 20, thereby transitioning to, for example, the service server priority mode. The processes of steps S204 to S207 correspond to processes executed in steps S111 and S122 of FIG. 16.

In this manner, the sensor device 10 side can be configured to issue the mode change request.

<Second Processing Related to Mode Transition>

Figure 18:
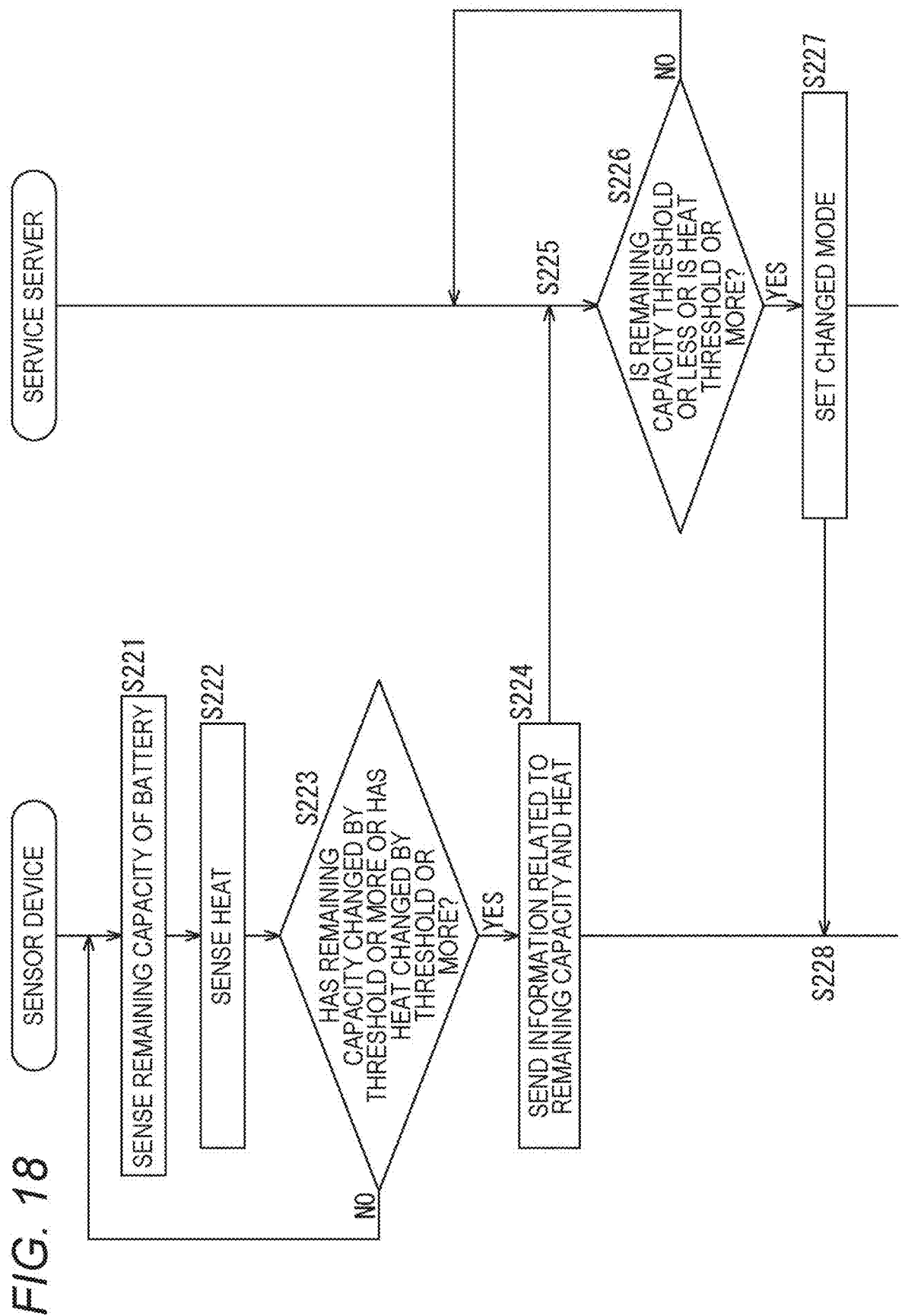
FIG. 18 is a diagram for explaining the processing related to the start of the mode switching.

Second processing related to the start of the mode transition will be described. FIG. 18 is a flowchart for describing processing in a case where the start of the mode transition is determined on the service server 20 side.

In step S221, the remaining capacity detector 152 of the sensor device 10 senses the remaining capacity of the battery 180. In step S222, the heat detector 154 senses the heat of the sensor device 10 (heat of the CPU or the GPU).

In step S223, the mode switching controller 156 determines whether or not the sensed remaining capacity has changed by a threshold or more, or whether or not the heat has changed by a threshold or more. The processes of steps S221 to S5223 are performed at a predetermined cycle. During such a sensing interval, it is determined whether or not a change amount of the change has changed by a threshold or more.

In step S223, in a case where it is determined that the change amount in the remaining capacity of the battery 180 is not the threshold or more, and in a case where it is also determined that the change amount in the heat is not the threshold or more, the processing returns to step S221, and the processes in step 221 and subsequent steps are repeated. On the other hand, in a case where it is determined in step S223 that the change amount in the remaining capacity of the battery 180 is the threshold or more, or/and in a case where it is determined that the change amount in the heat is the threshold or more, the processing proceeds to step S224.

In step S224, the sensor device 10 transmits information regarding the remaining capacity and the heat to the service server 20. At this time, the information regarding the remaining capacity of the battery 180 and the heat are transmitted. Here, the case where the change amount in the remaining capacity or the heat is the predetermined threshold or more is assumed as a trigger for transmitting the information regarding the remaining capacity and the heat to the service server 20. It is possible to prevent data from being frequently transmitted and received by providing such a trigger.

In step S226, the mode switching controller 252 of the service server 20 that has received the information from the sensor device 10 in step S225 determines whether the remaining capacity of the battery 180 of the sensor device 10 is the threshold or less or the heat is the threshold or more. In step S226, in a case where it is determined that the remaining capacity of the battery 180 of the sensor device 10 is not the threshold or less or the heat is not the threshold or more, the service server 20 maintains the state as it is without performing any processing as the processing related to the mode transition.

On the other hand, in a case where it is determined in step S226 that the remaining capacity of the battery 180 of the sensor device 10 is the threshold or less and/or the heat is the threshold or more, the processing proceeds to step S227. In step S227, a changed mode is set. Processes in and after step S227 are similar to the processes in and after step S206 (FIG. 17).

In this manner, it is possible to adopt the configuration in which the sensor device 10 transmits the information regarding the remaining capacity of the battery and the information regarding the heat to the service server 20 by the predetermined trigger and the service server 20 side determines whether or not to change the mode and issues an instruction to change the mode on the basis of the determination.

In this manner, in a case where the change amount in the remaining capacity of the battery 180 is sensed on the sensor device 10 side, it is also possible to observe a decrease rate of the capacity of the battery 180. Deterioration of the battery 180 may be detected by utilizing such observation and used as information for maintenance. For example, it is also possible to provide a mechanism in which it is determined that the battery 180 starts to deteriorate in a case where a change amount of the battery 180 increases, and a notification is issued to an administrator who manages the sensor device 10.

<Third Processing Related to Mode Transition>

Figure 19:
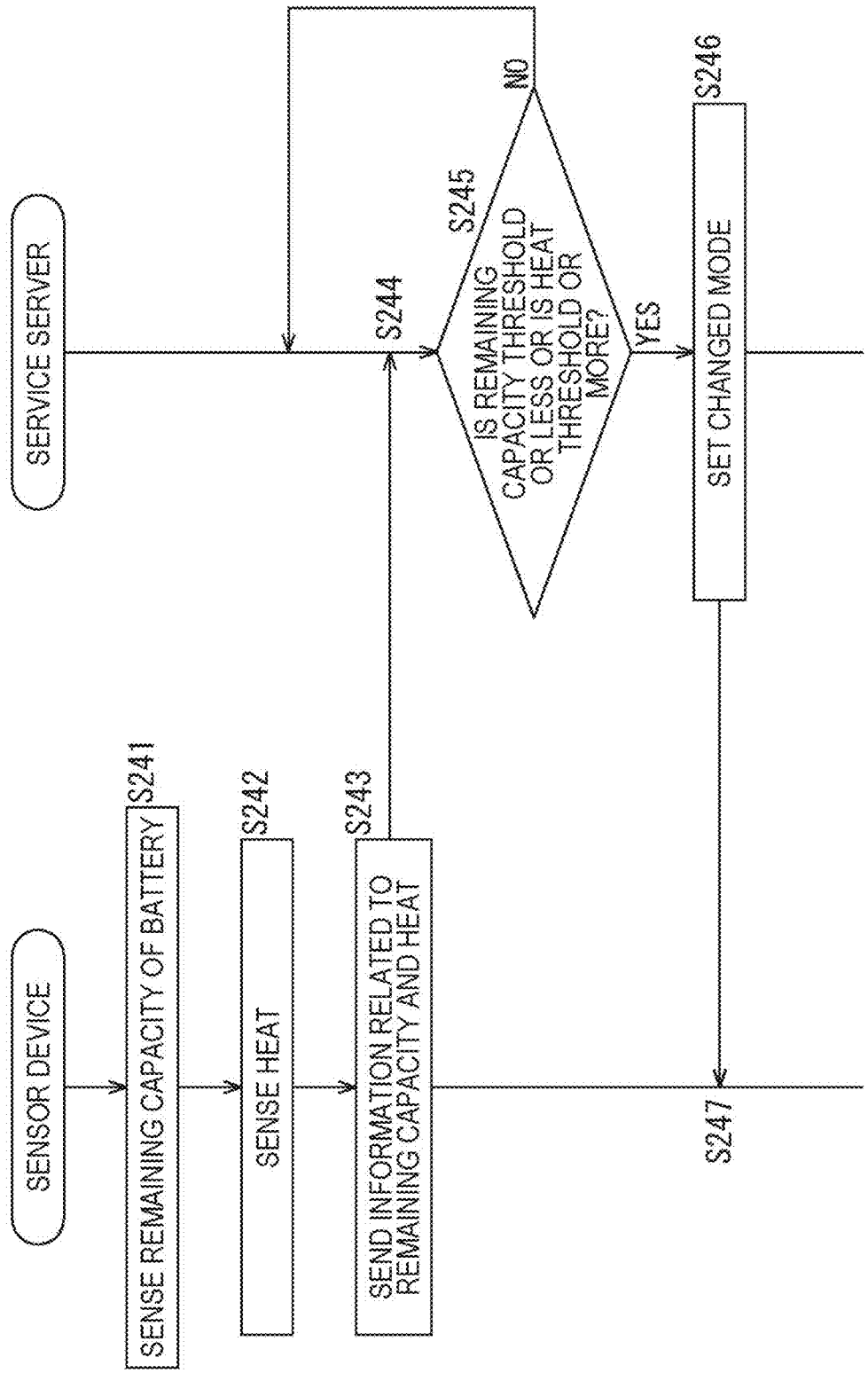
FIG. 19 is a diagram for explaining the processing relating to the start of mode switching.

Third processing related to the start of the mode transition will be described. FIG. 19 is a flowchart for describing processing in a case where the start of the mode transition is determined on the service server 20 side.

In step S241, the remaining capacity detector 152 of the sensor device 10 senses the remaining capacity of the battery 180. In step S242, the heat detector 154 senses the heat of the sensor device 10 (heat of the CPU or the GPU).

In step S243, information regarding the sensed remaining capacity and heat is transmitted to the service server 20. The processes of steps S241 to S243 are repeatedly performed at a predetermined cycle. That is, the sensor device 10 transmits the information regarding the remaining capacity and the heat to the service server 20 every predetermined cycle, and the service server 20 receives the information regarding the remaining capacity of the battery of the sensor device 10 and the heat of the device every predetermined cycle.

In step S244, the service server 20 that has received the information from the sensor device 10 determines in step S245 whether the remaining capacity of the battery 180 of the sensor device 10 is a threshold or less or the heat is a threshold or more. Since processes in and after step S244 are similar to the processes in and after step S225 (FIG. 18), the description thereof will be omitted.

In this manner, it is possible to adopt the configuration in which the sensor device 10 transmits the information regarding the remaining capacity of the battery and the information regarding the heat to the service server 20 at the predetermined cycle and the service server 20 side determines whether or not to change the mode and issues an instruction to change the mode on the basis of the determination.

In this manner, it is possible to switch between the mode in which the processing is mainly performed on the sensor device 10 side and the mode in which the processing is mainly performed on the service server 20 side depending on the remaining capacity of the battery 180 of the sensor device 10 or the amount of heat generated by the CPU or the like according to the present technology. In other words, it is possible to share the processing depending on the remaining capacity of the battery 180 of the sensor device 10 or the heat generation of the CPU or the like, and perform the processing in a state where the processing sharing is optimized according to the present technology. Furthermore, the shared processing can be processing by the AI function.

According to the present technology, it is possible to prevent the sensor device 10 from stopping its function due to sudden battery exhaustion or heat generation. Furthermore, even in a state where the function stops, it is possible to lengthen the time until reaching such a state.

Although the case where the mode transition occurs depending on the remaining capacity of the battery and the heat of the device has been described as an example in the above-described embodiment, the mode transition may occur by a trigger other than the remaining capacity or the heat, or in addition to the remaining capacity or the heat. For example, the mode switching may be performed depending on traffic of a communication network between the sensor device 10 and the service server 20. For example, in a case where the traffic of the communication network is congested, a mode can also be set such that the amount of data transmitted and received between the sensor device 10 and the service server 20 decreases.

Furthermore, the processing load of the service server 20 may be used as a trigger for the mode switching. Since the service server 20 transmits and receives data with the plurality of sensor devices 10 and performs processing, the processing load of the service server 20 is likely to increase. The present invention can also be applied to an embodiment in which a transition is made to a mode in which a part of the processing performed on the service server 20 side is performed on the sensor device 10 side in a case where the processing load of the service server 20 increases.

Furthermore, a remaining resource capacity of a memory or a remaining capacity of a storage on the service server 20 side may be used as a trigger for mode switching. It is also possible to adopt a configuration of performing switching to a mode in which the processing load on the service server 20 side is reduced in a case where the remaining resource capacity of the memory or the remaining capacity of the storage of the service server 20 is a predetermined threshold or less, or the like or performing switching to a mode in which a memory or a storage of a device other than the sensor device 10 or the service server 20 can be used.

In the above-described embodiment, communication between the sensor device 10 and the service server 20 may be encrypted for privacy protection. For example, in the service server priority mode, image data is sometimes transmitted from the sensor device 10 to the service server 20, and the transmitted image data can also be encrypted or compressed.

<Regarding Recording Medium>

The above-described series of processes can be executed not only by hardware but also by software. In a case where the series of processes is executed by software, a program constituting the software is installed in a computer. Here, the computer includes a computer built in dedicated hardware and a general-purpose personal computer, for example, capable of executing various functions by installing various programs.

Figure 20:
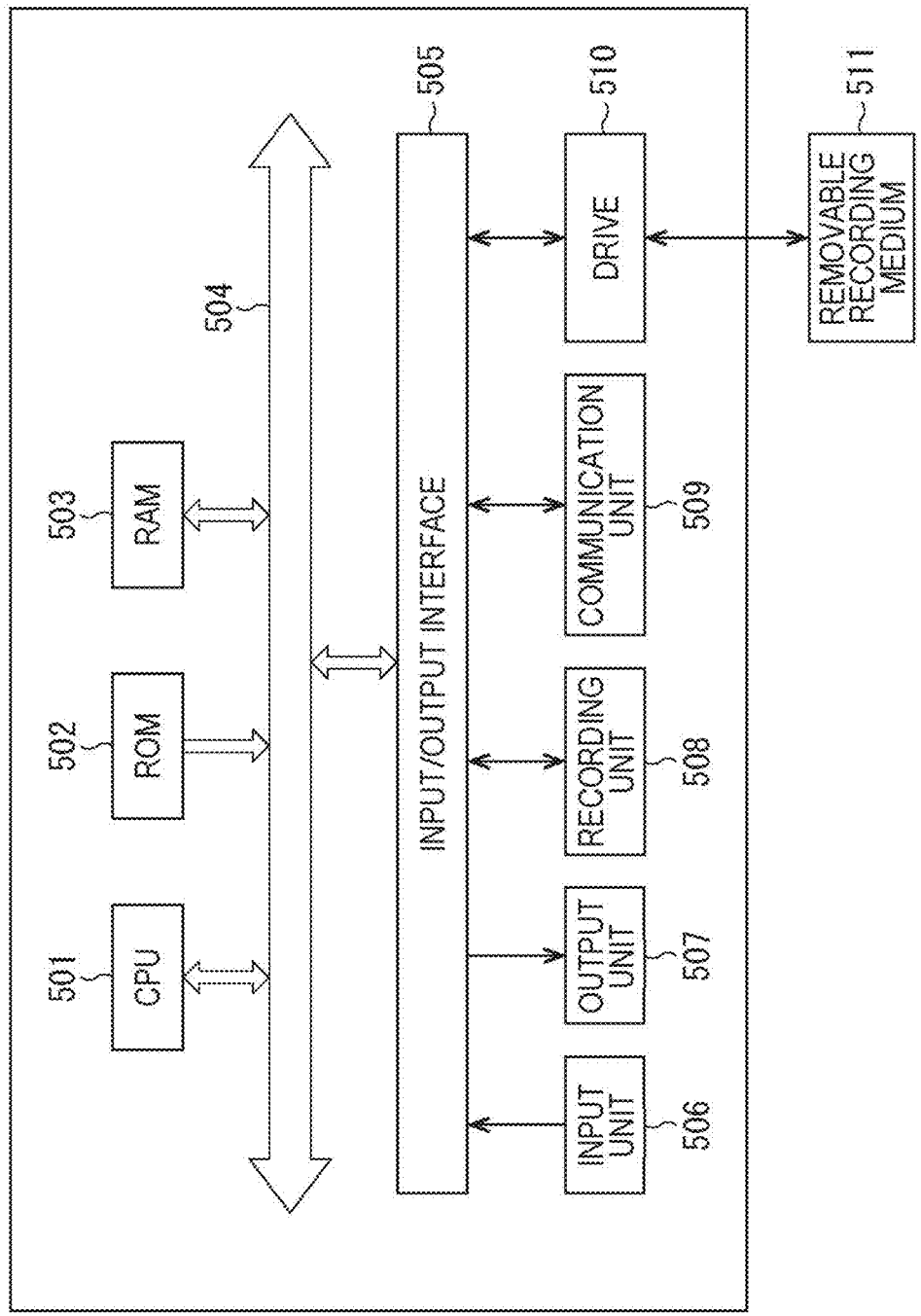
FIG. 20 is a diagram depicting a configuration example of a personal computer.

FIG. 20 is a block diagram depicting a configuration example of hardware configuration of a computer that executes the above-described series of processes according to a program. In the computer, a central processing unit (CPU) 501, a read only memory (ROM) 502, and a random access memory (RAM) 503 are mutually connected by a bus 504. Moreover, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a non-volatile memory, and the like. The communication unit 509 includes a network interface or the like. The drive 510 drives a removable recording medium 511 such as a magnetic disk, an optical disk, a magneto-optical disk, and a semiconductor memory.

In the computer configured as described above, for example, the CPU 501 executes a program stored in the storage unit 508 in the state of being loaded on the RAM 503 via the input/output interface 505 and the bus 504, thereby performing the above-described series of processes.

The program executed by the computer (CPU 501) can be provided in the state of being recorded on, for example, the removable recording medium 511 as a package medium or the like. Furthermore, the program can be provided via a wired or wireless transmission medium such as a local area network, the Internet, and digital satellite broadcasting.

In the computer, the program can be installed in the storage unit 508 via the input/output interface 505 by mounting the removable recording medium 511 to the drive 510. Furthermore, the program can be received by the communication unit 509 via a wired or wireless transmission medium and installed in the storage unit 508. Furthermore, the program can be installed in advance in the ROM 502 and the storage unit 508.

Note that the program executed by the computer may be a program in which the processes are performed in a time-series order according to the order described in the present specification or may be a program in which the processes are performed in parallel or at necessary timing such as when a call is made.

<Application Example to Mobile Body>

The technology according to the present disclosure (present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, and a robot.

Figure 21:
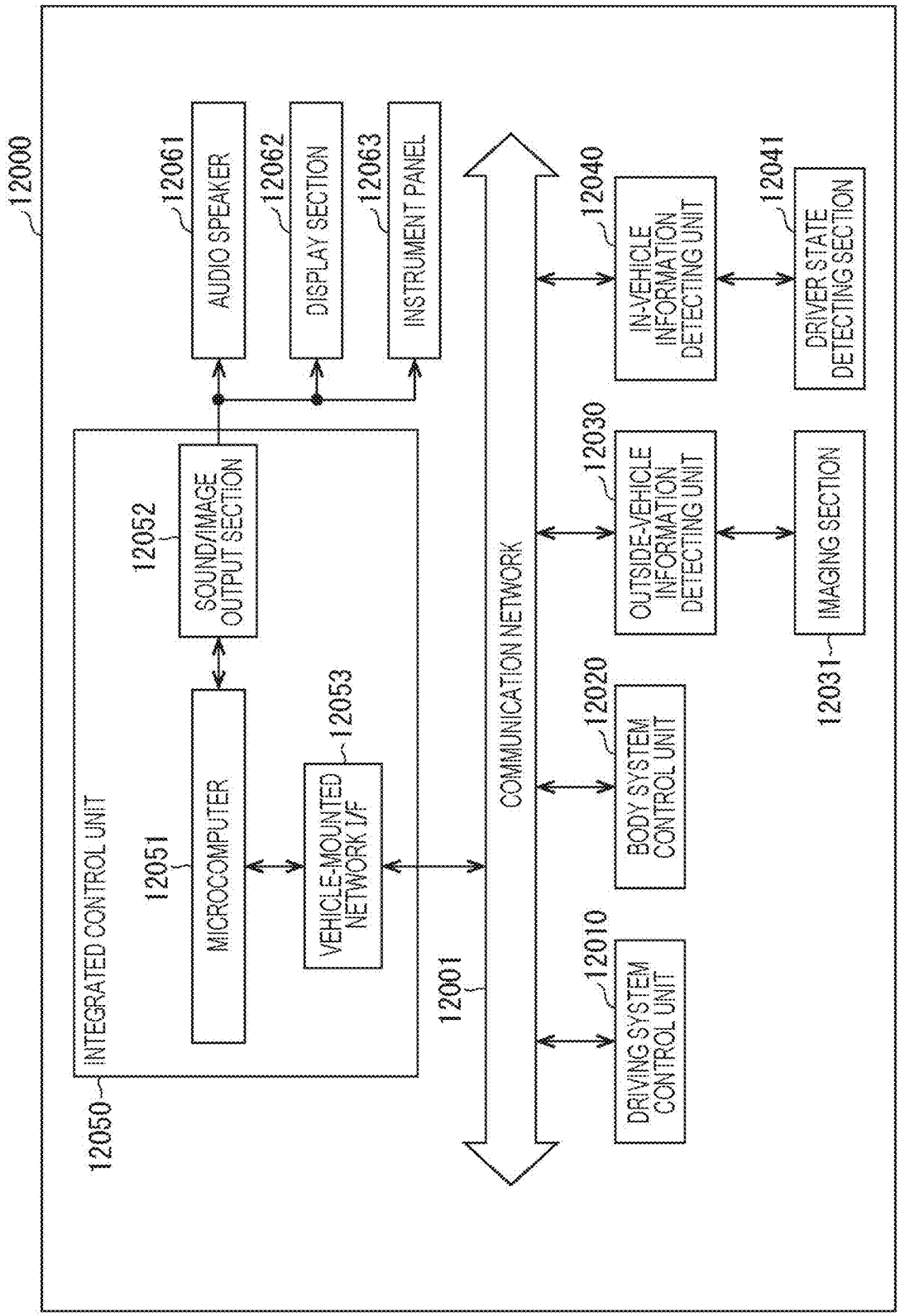
FIG. 21 is a block diagram depicting an example of schematic configuration of a vehicle control system.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

Figure 22:
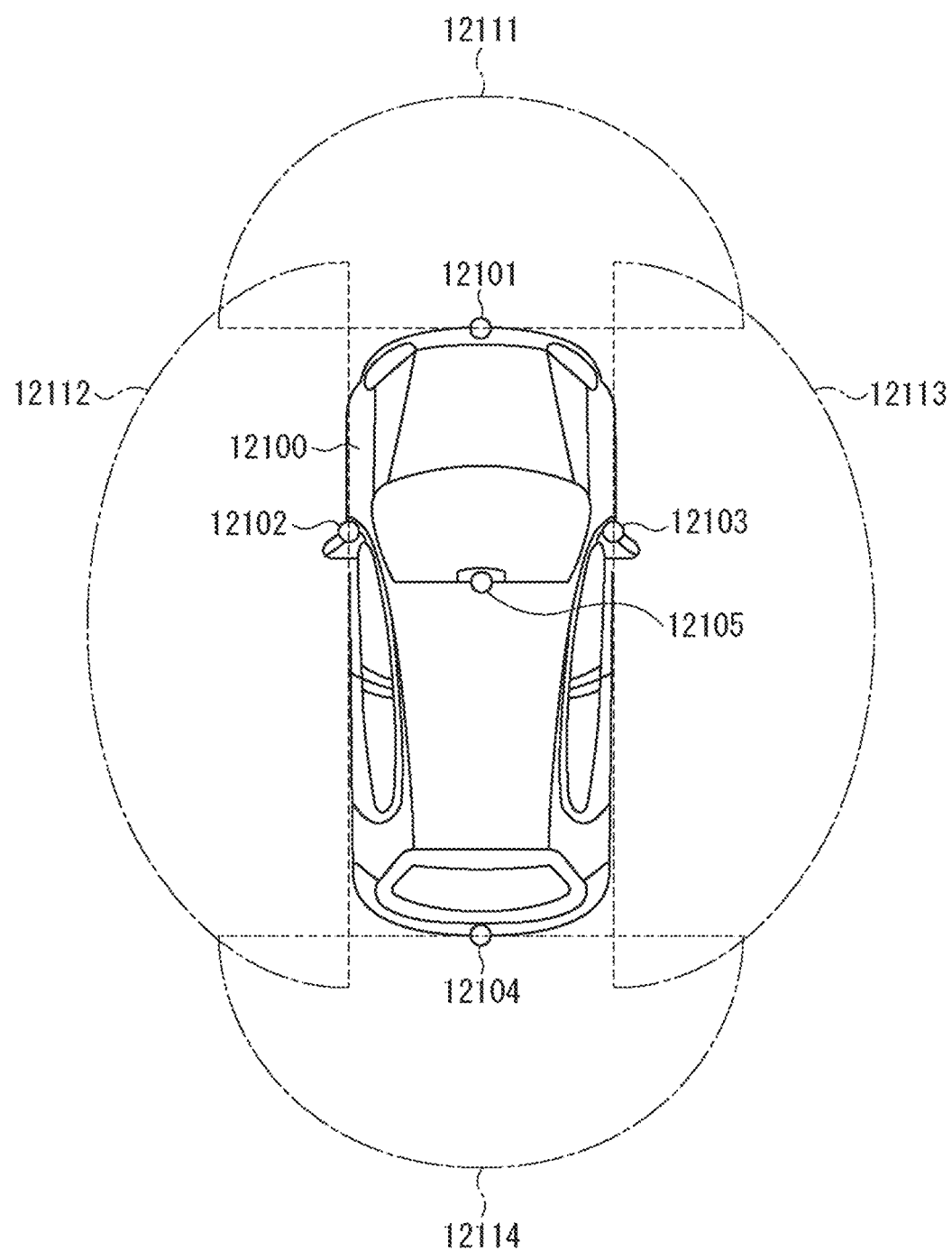
FIG. 22 is a diagram of assistance in explaining an example of installation positions of an outside-vehicle information detecting section and an imaging section.

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the present specification, the system represents the entire apparatus including a plurality of devices.

Note that the effects described in the present specification are merely examples and are not limited, and there may be other effects.

Note that embodiments of the present technology are not limited to the above-described embodiment, and various modifications can be made within a scope not departing from a gist of the present technology.

Note that the present technology can also have the following configurations.

(1)

An information processing apparatus including a mode switching unit that switches a mode depending on at least one of a remaining capacity of a battery or heat, in which the mode switching unit switches between a first mode in which a first device executes predetermined processing and a second mode in which a second device executes the predetermined processing.

(2)

The information processing apparatus according to (1), in which the predetermined processing is processing by an artificial intelligence (AI) function.

(3)

The information processing apparatus according to (1) or (2), in which
the mode switching unit sets the first mode in a case where a remaining capacity of a battery of the first device is a predetermined threshold or more and heat of the first device is a predetermined threshold or less, and sets the second mode in a case where the remaining capacity of the battery of the first device is the predetermined threshold or less and/or the heat of the first device is the predetermined threshold or more.

(4)

The information processing apparatus according to (2), in which
the first mode is a mode in which the first device executes the processing by the AI function, and the second mode is a mode in which the second device executes the processing by the AI function.

(5)

The information processing apparatus according to (2), in which
the second mode is a mode in which the first device and the second device execute the processing by the AI function.

(6)

The information processing apparatus according to any one of (1) to (5), in which
the first device senses the remaining capacity of the battery or the heat and issues a mode switching instruction to the second device in a case where the remaining capacity is a predetermined threshold or less or in a case where the heat is a predetermined threshold or more.

(7)

The information processing apparatus according to any one of (1) to (5), in which
the first device senses the remaining capacity of the battery and the heat every predetermined cycle, and transmits information regarding the remaining capacity and the heat to the second device, and
the second device determines whether or not to switch the mode on the basis of the information regarding the remaining capacity and the heat.

(8)

The information processing apparatus according to any one of (1) to (7), in which
in the second mode, the first device performs second processing having a smaller processing load than first processing performed by the first device in the first mode, and the second device performs the first processing performed by the first device.

(9)

The information processing apparatus according to any one of (1) to (8), in which
in the second mode, the first device selectively switches to and executes either first processing performed by the first device in the first mode or second processing having a smaller processing load than the first processing.

(10)

The information processing apparatus according to any one of (1) to (9), in which
the first device issues a notification to the second device when the remaining capacity of the battery decreases to a level of reaching an unsustainable state.

(11)

The information processing apparatus according to any one of (1) to (10), in which
the first device is a sensor device that performs sensing, and the second device is a server that acquires information sensed by the sensor device.

(12)

An information processing method including
switching, by an information processing apparatus, between a first mode in which a first device executes predetermined processing and a second mode in which a second device executes the predetermined processing depending on at least one of a remaining capacity or a battery and heat.

(13)

A program configured to cause a computer to execute
a process of switching between a first mode in which a first device executes predetermined processing and a second mode in which a second device executes the predetermined processing depending on at least one of a remaining capacity of a battery or heat.

REFERENCE SIGNS LIST

1 Data distribution system
2 Service server
10 Sensor device
20 Service server
30 User device
40 Authentication server
100 Sensor unit
110 Positioning unit
130 Processing unit
132 ID transmission unit
134 Key reception unit
136 Sensor data acquisition unit
138 Pre-processing unit
140 Model acquisition unit
142 Recognition unit
144 Data generation unit
146 Distribution unit
152 Remaining capacity detector
154 Heat detector
156 Mode switching controller
160 Storage unit
170 Communication unit
180 Battery
230 Processing unit
232 ID transmission unit
234 Request acceptance unit
236 Capability information acquisition unit
238 Model generation unit
240 Model transmission unit
242 Data acquisition unit
243 Recognition unit
246 Distribution unit
248 Recognition unit
250 Pre-processing unit
252 Mode switching controller
260 Storage unit
270 Communication unit
302 Teacher data
310 Recognition model

The invention claimed is:

1. An information processing apparatus comprising:
mode switching circuitry configured to switch a mode depending on at least one of a remaining capacity of a battery of a first device including circuitry or a heat measurement of the first device, wherein the mode switching circuitry switches between a first mode in which the first device executes predetermined processing and a second mode in which a second device including circuitry executes the predetermined processing, wherein the first device senses the remaining capacity of the battery and the heat measurement every predetermined cycle, and transmits information regarding the remaining capacity and the heat measurement to the second device, and wherein the second device determines whether or not to switch the mode on a basis of the information regarding the remaining capacity and the heat measurement.

2. The information processing apparatus according to claim 1, wherein
the predetermined processing is processing by an artificial intelligence (AI) function.

3. The information processing apparatus according to claim 1, wherein
the mode switching circuitry sets the first mode in a case where a remaining capacity of the battery of the first device is a first predetermined threshold or more and the heat measurement of the first device is a second predetermined threshold or less, and sets the second mode in a case where the remaining capacity of the battery of the first device is the first predetermined threshold or less or the heat measurement of the first device is the second predetermined threshold or more.

4. The information processing apparatus according to claim 2, wherein
the first mode is a mode in which the first device executes the processing by the AI function, and the second mode is a mode in which the second device executes the processing by the AI function.

5. The information processing apparatus according to claim 2, wherein
the second mode is a mode in which the first device and the second device execute the processing by the AI function.

6. The information processing apparatus according to claim 1, wherein
the first device senses the remaining capacity of the battery or the heat measurement and issues a mode switching instruction to the second device in a case where the remaining capacity is a predetermined threshold or less or in a case where the heat measurement is a predetermined threshold or more.

7. The information processing apparatus according to claim 1, wherein
in the second mode, the first device performs second processing having a smaller processing load than first processing performed by the first device in the first mode, and the second device performs the first processing performed by the first device.

8. The information processing apparatus according to claim 1, wherein
in the second mode, the first device selectively switches to and executes either first processing performed by the first device in the first mode or second processing having a smaller processing load than the first processing.

9. The information processing apparatus according to claim 1, wherein
the first device issues a notification to the second device when the remaining capacity of the battery decreases to a level of reaching an unsustainable state.

10. The information processing apparatus according to claim 1, wherein
the first device is a sensor device that performs sensing, and the second device is a server that acquires information sensed by the sensor device.

11. An information processing method comprising
switching, by an information processing apparatus, between a first mode in which a first device including circuitry executes predetermined processing and a second mode in which a second device including circuitry executes the predetermined processing depending on at least one of a remaining capacity of a battery of the first device or a heat measurement of the first device;

sensing, by the first device, the remaining capacity of the battery and the heat measurement every predetermined cycle, and transmitting information regarding the remaining capacity and the heat measurement to the second device; and determining, by the second device, whether or not to switch the mode on a basis of the information regarding the remaining capacity and the heat measurement.

12. A non-transitory computer-readable storage medium storing executable instructions, which when executed by circuitry, cause the circuitry to perform a method, the method comprising:

switching between a first mode in which a first device including circuitry executes predetermined processing and a second mode in which a second device including circuitry executes the predetermined processing depending on at least one of a remaining capacity of a battery of the first device or a heat measurement of the first device;

sensing, by the first device, the remaining capacity of the battery and the heat measurement every predetermined cycle, and transmitting information regarding the remaining capacity and the heat measurement to the second device; and determining, by the second device, whether or not to switch the mode on a basis of the information regarding the remaining capacity and the heat measurement.

* * * * *